United States Patent [19]

Ohuchi

[11] Patent Number: 5,025,481

[45] Date of Patent: Jun. 18, 1991

[54] DOT REGION DISCRIMINATING METHOD

[75] Inventor: Satoshi Ohuchi, Tokyo, Japan

[73] Assignee: Ricoh Company, Ltd., Japan

[21] Appl. No.: 417,074

[22] Filed: Oct. 4, 1989

[30] Foreign Application Priority Data

Oct. 21, 1988 [JP] Japan .................. 63-263884
Oct. 24, 1988 [JP] Japan .................. 63-266212
Oct. 26, 1988 [JP] Japan .................. 63-268311
Oct. 26, 1988 [JP] Japan .................. 63-268312
Nov. 2, 1988 [JP] Japan .................. 63-275999

[51] Int. Cl.⁵ .............................. G06K 9/38
[52] U.S. Cl. .......................... 382/53; 382/9
[58] Field of Search ............. 382/9, 53; 358/462, 358/464

[56] References Cited

U.S. PATENT DOCUMENTS

| | | | |
|---|---|---|---|
| 4,403,257 | 9/1983 | Hsieh | 358/462 |
| 4,503,556 | 3/1985 | Scherl et al. | 382/9 |
| 4,741,046 | 4/1988 | Matsunawa et al. | 382/9 |
| 4,760,463 | 7/1988 | Nonoyama et al. | 358/462 |
| 4,817,186 | 3/1989 | Goolsbey et al. | 382/9 |
| 4,856,074 | 8/1989 | Nagaoka | 382/9 |
| 4,903,145 | 2/1990 | Funada | 358/462 |
| 4,932,065 | 6/1990 | Feldgajer | 382/9 |

FOREIGN PATENT DOCUMENTS 3224319 1/1983 Fed. Rep. of Germany .
3446880 7/1985 Fed. Rep. of Germany .
58-115975 9/1983 Japan .

OTHER PUBLICATIONS

H. Ueno, "Reproduction of Dot Photograph by Dot Printer", (Oct. 1986), pp. 71–76, vol. 53, No. 4.

Primary Examiner—Stephen Brinich
Attorney, Agent, or Firm—Mason, Fenwick & Lawrence

[57] ABSTRACT

A dot region discriminating method discriminates a dot region of an image which is described by a digital input image signal. The method includes detecting one or more extreme points from a first local region within the image. Each of the extreme points corresponds to a peak or valley of a density change of a picture element within the first local region. The method further comprises detecting whether or not one of (1) a center picture element within one of said local regions of the image or (2) one of the second local regions, belongs to a dot region, this second detecting step being based on a distribution of the extreme points detected in the first local region by the first detecting step. Finally, the method involves discriminating the dot region of the image based on the second detection step.

70 Claims, 13 Drawing Sheets

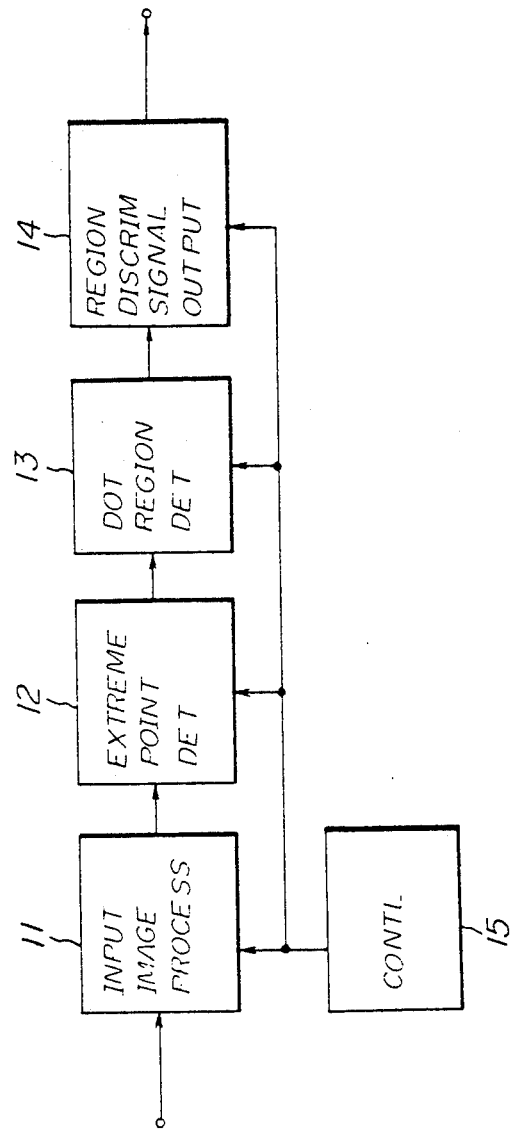

FIG.7A
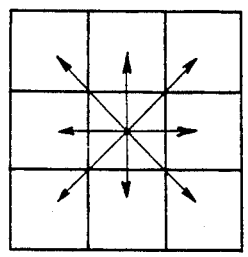
M=3
FIG.7B
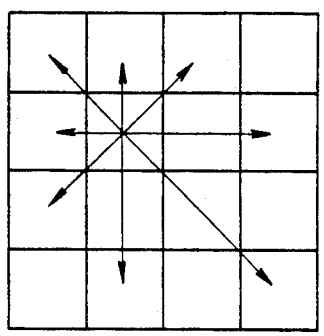
M=4
FIG.7C
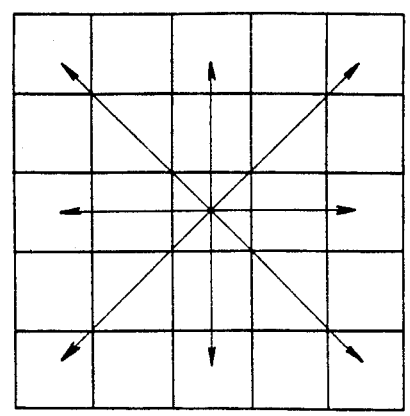
M=5
FIG.5

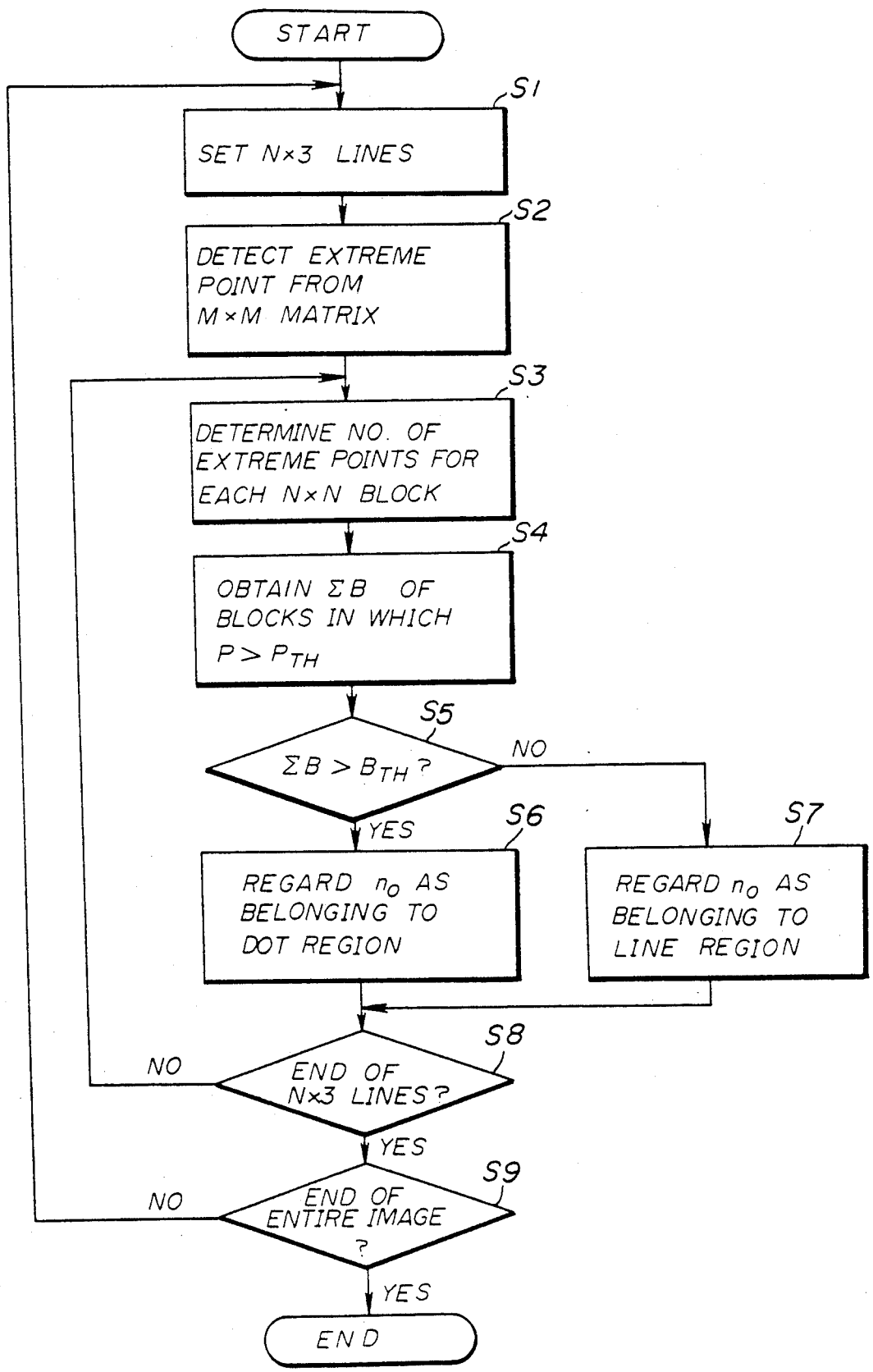

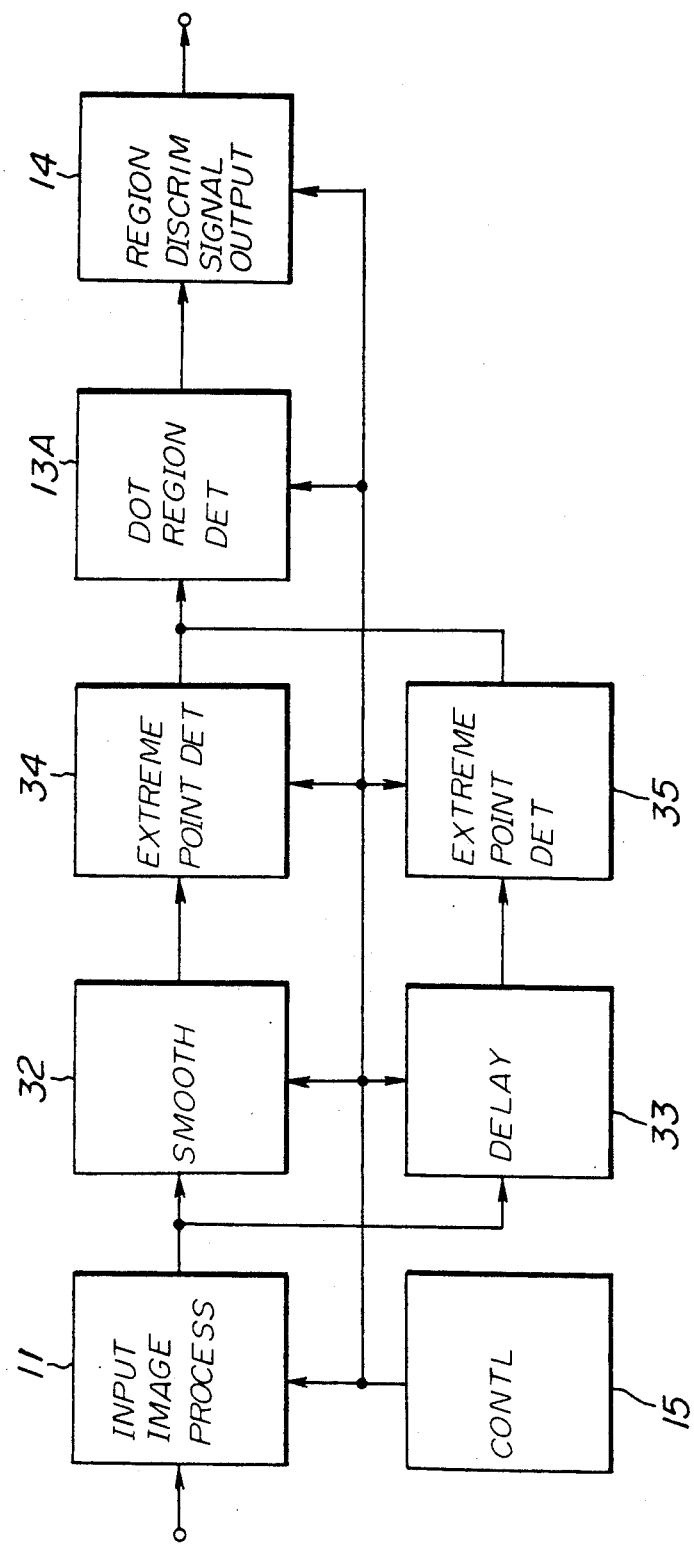

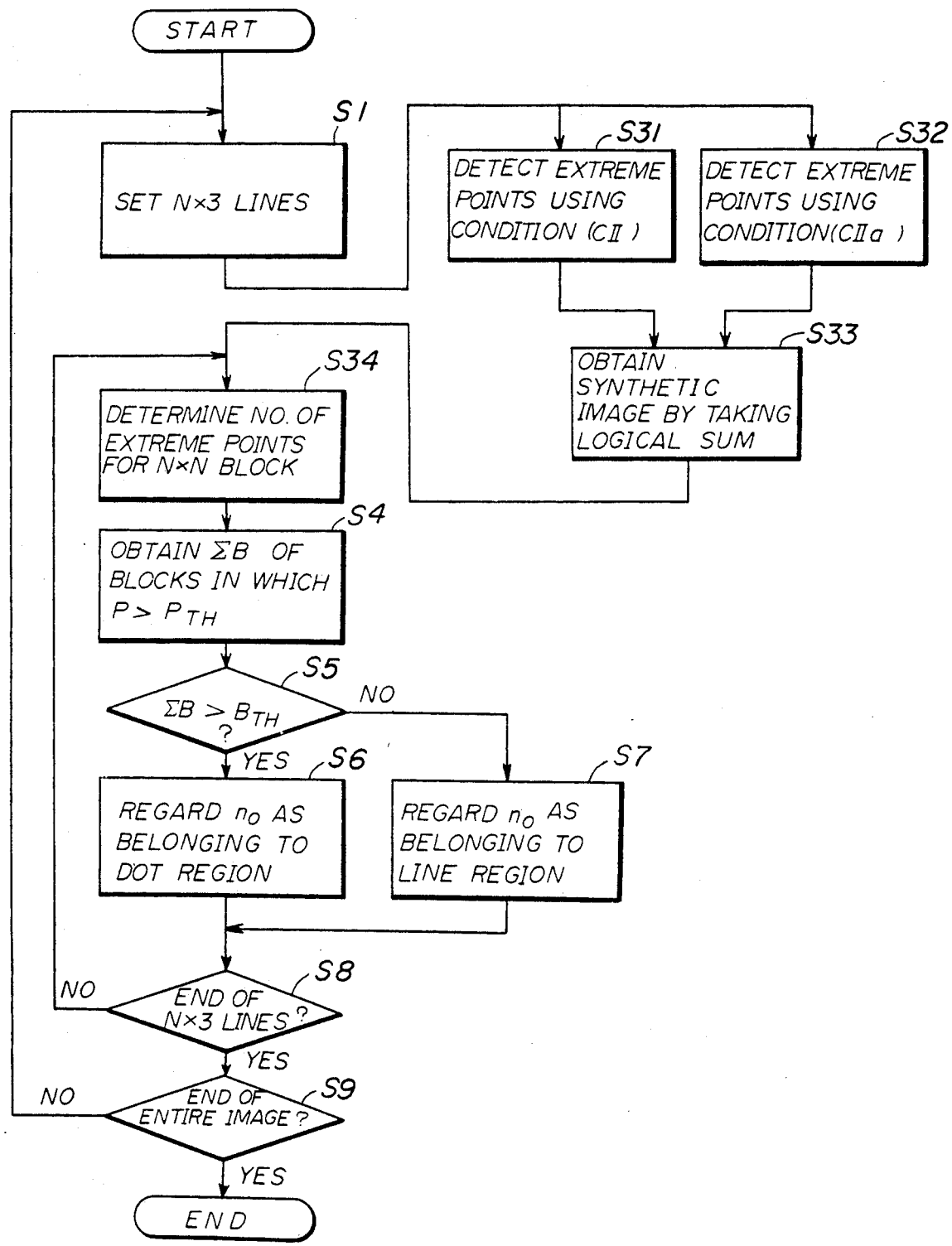

DOT REGION DISCRIMINATING METHOD

BACKGROUND OF THE INVENTION

The present invention generally relates to dot region discriminating methods, and more particularly to a dot region discriminating method for automatically discriminating a dot region from a line region within an image.

In copying machines and facsimile machines, an image which is copied, transmitted or received may be a composite image in which a dot image and a line image coexist. The dot image refers to a photograph, a picture or the like which is described by dots, while the line image refers to a character or the like which is described by lines. In order to improve the quality of the copied, transmitted or received image, it is desirable to carry out a process of eliminating the moire with respect to the dot region such as a dot photograph and to carry out a sharpening process with respect to the line region such as a character. In addition, when transmitting the composite image, it is desirable from the point of view of improving the compression rate that a coding process is carried out after processes appropriate for characteristics of various regions of the image are carried out.

As a method of discriminating the dot region from the image, there is a method proposed by H. Ueno, "Reproduction of Dot Photograph by Dot Printer", Oki Denki Research and Development, No. 132, Vol. 53, No. 4, Oct. 1986. This method proposed by H. Ueno will hereinafter be referred to as the Ueno method.

FIG. 1 shows the basic processes of the Ueno method. An input image signal is generated by making a raster scan of a document image in a step 1. This input image signal is a digital multilevel signal. Then, in a step 2, a difference signal is generated from the input image signal by calculating a density difference of the brightness between each two mutually adjacent picture elements along the direction of the raster scan. An extreme point (peak or valley) of the density change of the picture elements is detected from the difference signal in a step 3. The extreme point is detected when one of the following conditions are satisfied.

Condition (i): The picture element is regarded as the extreme point when the sign of the difference signal changes before and after this picture element as shown in FIG. 2A.

Condition (ii): The picture element is regarded as the extreme point when the sign of the difference signal changes before and after this picture element which has a difference value of zero as shown in FIG. 2B.

Condition (iii): The picture element is regarded as the extreme point when a distance between this picture element and a previous extreme point becomes a predetermined threshold value $L_{th0}$.

Then, a dot region is detected in a step 4 based on the extreme points detected in the step 3. The dot region is detected when the following two conditions are simultaneously satisfied.

Condition (iv): A distance $L(i)$ between two successive extreme points is within threshold values $L_{th1}$ and $L_{th2}$, that is, $L_{th1} < L(i) < L_{th2}$.

Condition (v): A difference between the distance $L(i)$ at the present position and a distance $L(i-1)$ at a previous position is within a threshold value $L_{th3}$, that is, $|L(i) - L(i-1)| \leq L_{th3}$.

Finally, in a step 5, an output image signal which corresponds to the line image or the dot image is generated depending on the discrimination result, that is, whether or not the dot region is detected in the step 4.

The Ueno method discriminates the dot region on a premise that the peaks and valleys of the density level of the dot region occurs regularly. But in general, a large number of extreme points exist in regions such as character regions and continuous gradation photograph regions which are other than the dot region. For this reason, the Ueno method suffers a problem in that the dot region cannot be discriminated with a high accuracy.

In addition, the Ueno method detects the dot region by making a one dimensional comparison of the two successive picture elements which are arranged on the raster scan line. As a result, the distance $L(i)$ between the two successive extreme points becomes long in cases where the dot region occupies a large or small area of the document image and in a case where a skew of the document occurs and a screen angle shifts from a horizontal direction. In such cases, there is a problem in that it is extremely difficult to discriminate the dot region from other regions of the document image such as the character region.

SUMMARY OF THE INVENTION

Accordingly, it is a general object of the present invention to provide a novel and useful dot region discriminating method in which the problems described above are eliminated.

Another and more specific object of the present invention is to provide a dot region discriminating method for discriminating a dot region of an image which is described by a digital multilevel input image signal comprises an extreme point detecting step for detecting one or a plurality of extreme points from a first local region within the image, where each of the extreme points correspond to a peak or a valley of a density change of a picture element within the first local region and the first local region corresponds to a matrix which comprises M × M picture elements, a dot region detecting step for detecting whether or not one of a center picture element within one of second local regions of the image and the second local regions belongs to a dot region based on a distribution of the extreme points detected within the first local region by the extreme point detecting step, where each of the second local regions correspond to a block which comprises N × N picture elements, and a discriminating step for discriminating the dot region of the image based on the detection made by the dot region detecting step. According to the dot region discriminating method of the present invention, the extreme points of the picture elements of the digital multilevel input image signal are detected using the local two dimensional extreme point detection pattern, and the dot region is detected using the local two dimensional dot detection pattern based on the result of the detection of the extreme points. As a result, the dot region can be discriminated from other regions with a high accuracy compared to the conventional method. The accurate discrimination of the dot region is possible even when the dot region occupies a large or small area of the document image or when a skew of the document occurs and the screen angle shifts from the horizontal direction.

Still another object of the present invention is to provide a dot region discriminating method wherein the dot region detecting step includes substeps of independently counting the extreme points which correspond to the peaks in each of blocks which correspond to the second local regions and the extreme points which correspond to the valleys in each of the blocks and determining a larger one of the counted extreme points in each block as the number of extreme points for the block, and the discriminating step discriminates whether or not a predetermined picture element within an object block belongs to the dot region based on a relationship of the number of extreme points of the object block and the numbers of extreme points of the blocks surrounding the object block.

A further object of the present invention is to provide a dot region discriminating method which further comprises a smoothing step for smoothing the digital multilevel input image signal prior to the extreme point detecting step, the extreme point detecting step detects the one or a plurality of extreme points from the first local region within the image and a smoothened image which is described by a smoothened digital multilevel input image signal, and the dot region detecting step detects the dot region based on a synthesized image which is a logical sum of the image and the smoothened image. According to the dot region discriminating method of the present invention, the extreme points of the picture elements of the digital multilevel input image signal and the extreme points of the picture elements of the smoothened digital multilevel input image signal are detected using the local two dimensional extreme point detection pattern, a synthetic image is obtained by taking a logical sum of the extreme points detected from the smoothened input image signal and the extreme points detected from the input image signal, and the dot region is detected using the local two dimensional dot detection pattern based on the result of the detection of the extreme points detected from the synthetic image. As a result, the dot region can be discriminated with ease from other regions with a high accuracy regardless of whether the dot region occupies a large or small area of the document image.

Another object of the present invention is to provide a dot region discriminating method wherein the extreme point detecting step independently detects one or a plurality of extreme points from the first local region within the image based on first and second extreme point detection conditions which are mutually different, and the dot region detecting step detects the dot region based on a logical sum of results of the extreme point detection made with the first and second extreme point detection conditions. According to the dot region discriminating method of the present invention, the extreme points of the picture elements of the digital multilevel input image signal are detected independently using two kinds of local two dimensional extreme point detection patterns, a synthetic image is obtained by taking a logical sum of the extreme points detected from the input image signal using the two extreme point detection patterns, and the dot region is detected using the local two dimensional dot detection pattern based on the result of the detection of the extreme points detected from the synthetic image. As a result, the dot region can be discriminated with ease from other regions with a high accuracy regardless of whether the dot region occupies a large or small area of the document image.

Still another object of the present invention is to provide a dot region discriminating method wherein the extreme point detecting step detects that a center picture element within the first local region is an extreme point when a density level of the center picture element within the first local region is greater than or less than density levels of surrounding picture elements within the first local region. According to the dot region discriminating method of the present invention, the extreme points of the picture elements of the digital multilevel input image signal are detected using the local two dimensional extreme point detection pattern, and the dot region is detected using the local two dimensional dot detection pattern based on the result of the detection of the extreme points. As a result, the dot region can be discriminated from other regions with a high accuracy compared to the conventional method. The accurate discrimination of the dot region is possible even when the dot region occupies a large or small area of the document image or when a skew of the document occurs and the screen angle shifts from the horizontal direction. In addition, the detection of the dot region is less affected by digital noise.

A further object of the present invention is to provide a dot region discriminating method wherein the dot region detecting step includes substeps of subdividing each block into a plurality of small regions and determining the number of extreme points within each block depending on a distribution of the extreme points detected within the small regions of the block. According to the dot region discriminating method of the present invention, the extreme points of the picture elements of the digital multilevel input image signal are detected using the local two dimensional extreme point detection pattern by subdividing each block into small regions, and the dot region is detected using the local two dimensional dot detection pattern based on the result of the detection of the extreme points. As a result, the dot region can be discriminated from other regions with a high accuracy even when the document image includes fine characters or thin characters which have extreme point patterns similar to that of the dot region.

Other objects and further features of the present invention will be apparent from the following detailed description when read in conjunction with the accompanying drawings.

BRIEF DESCRIPTION OF THE DRAWINGS

FIG. 3 is a system block diagram showing an embodiment of a dot region discriminating apparatus which is applied with the first embodiment;

FIGS 4A through 4C respectively show embodiments of a matrix which comprises M × picture elements and is sued to detect an extreme point;

FIG. 5 shows an embodiment of a block which comprises N × N picture elements and is used to detect a dot region;

FIGS. 7A through 7C respectively show directions in which the picture elements of the matrix are compared;

FIG. 8 is a flow chart for explaining an embodiment of an operation of a control part shown in FIG. 3;

FIG. 11 is a system block diagram showing an embodiment of a dot region discriminating apparatus which is applied with a second embodiment of the dot region discriminating method according to the present invention;

FIGS. 14A and 14B respectively show embodiments of a matrix which comprises M × picture elements and is used to detect an extreme point;

FIG. 15 is a flow chart for explaining an embodiment of an operation of the control part shown in FIG. 13;

DESCRIPTION OF THE PREFERRED EMBODIMENTS

Figure 1:
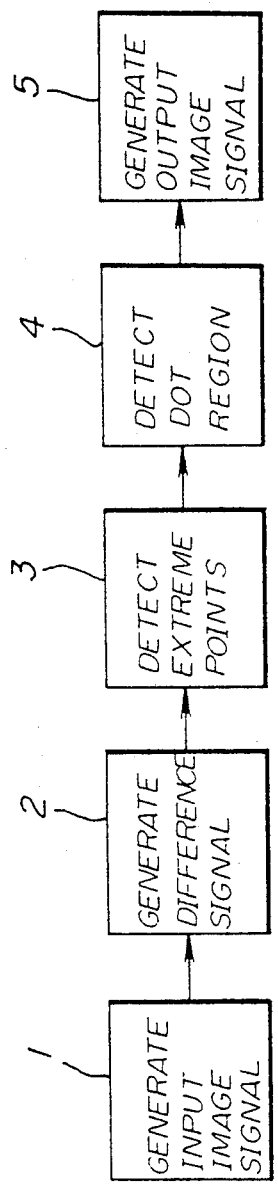
FIG. 1 shows process of a conventional dot region discriminating method proposed by Ueno.
Figure 2B:
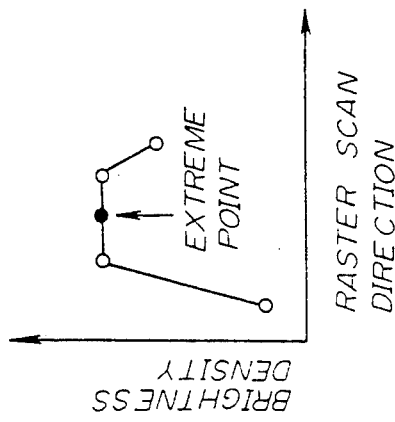
FIGS. 2A and 2B are diagrams for explaining the conventional dot region discriminating method proposed by Ueno.
Figure 2A:
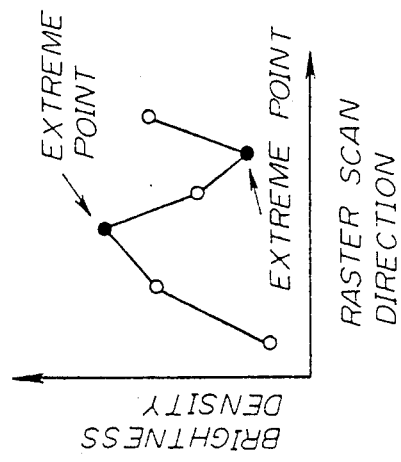

First, a description will be given of a first embodiment of a dot region discriminating method according to the present invention, by referring to FIG. 3 which shows a dot region discriminating apparatus applied with the first embodiment.

For the sake of convenience, a description will be given of a case where an image to be processed is a black-and-white document image. When applying the present invention to a color image, the original color image is separated into three primary color signals of red, green and blue (RGB) or yellow, magenta and cyan (YMC) depending on the display format such as a cathode ray tube (CRT) display and a printing display of the reproduced image. Then, the dot region discriminating method according to the present invention is used with respect to each of the separated primary colors.

In FIG. 3, an input image signal is generated by making a raster scan of a document image in which a dot image such as a dot photograph and a line image such as a character coexist. This input image signal is a digital multilevel signal including a luminance signal which corresponds to the density level. An input image processing part 11 stores a quantity of the received input image signal at least amounting to a predetermined number of scan lines which are required to discriminate the dot region in a latter process. For example, the input image signal amounting to N × 3 scan lines are stored in line memories (not shown), where N denotes a number of picture elements which determines a unit block B comprising N × N picture elements for detecting the dot region in a latter process.

An extreme point detecting part 12 receives the input image signal (digital multilevel signal) from the input image processing part 11 and successively applies a predetermined matrix comprising M × M picture elements with respect to each picture element described by the input image signal. For example, the predetermined matrix is a matrix comprising 3×3 picture elements (M=3) as shown in FIG. 4A, a matrix comprising 4×4 picture elements (M=4) as shown in FIG. 4B, or a matrix comprising 5×5 picture elements (M=5) as shown in FIG. 4C. The extreme point detecting part 12 detects whether or not a center picture element $m_0$ of the predetermined M × M matrix is an extreme point which indicates a peak or valley of the density change based on the density relationships with surrounding picture elements $m_1$ through $m_i$, where $i = M^2 - 1$.

A dot region detecting part 13 divides the image which is described by the input image signal into blocks B each comprising N × N picture elements, and counts the number of extreme points indicating the peaks and the number of extreme points indicating the valleys for each block B. The larger number of extreme points in each block B is determined as the number of extreme points for that block B. FIG. 5 shows a case where N=9 and the block B comprises 9×9 picture elements. The dot region detecting part 13 discriminates whether or not a center picture element $n_0$ in FIG. 6 of an object block $B_0$ shown in FIG. 6 or all picture elements $n_0$ through $n_{80}$ within the object block $B_0$ belong to the dot region, based on the relationship between a number $P_0$ of extreme points of the object block $B_0$ and each number $P$ of extreme points of surrounding blocks $B_1$ through $B_8$.

A region discrimination signal output part 14 outputs a discrimination signal which indicates whether each picture element belongs to the dot region or the line region based on the result of the detection made in the dot region detecting part 13.

A control part 15 controls the operation sequence of the parts 11, 12, 13 and 14.

The extreme point detecting part 12 detects the extreme point which indicates the peak or valley of the density change by use of a two dimensional extreme point detection pattern in which both the following conditions (I) and (II) must be satisfied simultaneously.

Condition (I): With the matrix M × M picture elements, the center picture element $m_0$ is an extreme point when the density level of the center picture element $m_0$ is a maximum or a minimum compared to the density levels of the surrounding picture elements $m_1$ through $m_i$, that is, $m_0 > m_1 \sim m_i$ or $m_0 < m_1 \sim m_i$.

Condition (II): Within the matrix comprising M × M picture elements, the center picture element $m_0$ is an extreme point when an absolute value of a density difference $\Delta m$ between the density levels of the center picture element $m_0$ and each of the surrounding picture elements $m_1$ through $m_i$ is greater than or equal to a predetermined threshold value $\Delta m_{TH}$, that is, $|\Delta m| > \Delta m_{TH}$. The surrounding picture elements $m_1$ through $m_i$ are respectively located in a specific direction (right, left, up, down or 45° angle) from the center picture element $m_0$ as indicated by arrows in FIGS. 7A, 7B and 7C for cases where M=3, M=4 and M=5.

As described above, generally, a large number of extreme points exist in a character region similarly to the dot region. For this reason, it is difficult to detect only the extreme points of the dot region solely from the condition (I), and the extreme points of the dot region are thus detected by using both the conditions (I) and (II).

THe dot region detecting part 13 detects the dot region by use of a two dimensional dot region detection pattern in which one of the following conditions (IIIa), (IIIb), (IIIc) and (IIId) is satisfied. One of the conditions (IIIa), (IIIb), (IIIc) and (IIId) is used depending on the reproduction. The condition (IIIa) or (IIIb) is used when carrying out the process by moving the block B comprising N × N picture elements one picture element at a time. The condition (IIIc) or (IIId) is used when carrying out the process by moving the block B comprising N × N picture elements one block at a time.

Condition (IIIa): In the object block $B_0$ and the surrounding blocks $B_1$ through $B_8$ shown in FIG. 6, the center picture element $n_0$ of the object block $B_0$ shown in FIG. 5 is regarded as the dot region when a number $\Sigma B$ of blocks in which the number P of extreme points is greater than or equal to a predetermined threshold value $P_{TH}$ is greater than or equal to a predetermined threshold value $B_{TH}$, that is, when [the number $\Sigma B$ of blocks in which $P > P_{TH}] > B_{TH}$.

Condition (IIIb): In the object block $B_0$ and the surrounding blocks $B_1$ through $B_8$ shown in FIG. 6, the center picture element $n_0$ of the object block $B_0$ shown in FIG. 5 is regarded as the dot region when a sum total $\Sigma |\Delta P|$ of absolute values of differences $\Delta P$ between the number of extreme points in the object block $B_0$ and the surrounding blocks $B_1$ through $B_8$ is less than or equal to a predetermined threshold value $\Delta P_{TH}$, that is, when $\Sigma |\Delta P| < \Delta P_{TH}$.

Condition (IIIc): In the object block $B_0$ and the surrounding blocks $B_1$ through $B_8$ shown in FIG. 6, all the picture elements $n_0$ through $n_{80}$ within the object block $B_0$ shown in FIG. 5 are regarded as the dot regions when the number $\Sigma B$ of blocks in which the number P of extreme points is greater than or equal tot eh predetermined threshold value $P_{TH}$ is greater than or equal to the predetermined threshold value $B_{TH}$.

Condition (IIId): IN the object block $B_0$ and the surrounding blocks $B_1$ through $B_8$ shown in FIG. 6, all the picture elements $n_0$ through $n_{80}$ within the object block $B_0$ shown in FIG. 5 are regarded as the dot regions when the sum total $\Sigma |\Delta P|$ of absolute values of the differences $\Delta P$ between the number of extreme points in the object block $B_0$ and the surrounding blocks $B_1$ and $B_8$ is less than or equal tot eh predetermined threshold value $\Delta P_{TH}$.

Next, a description will be given of the operation of this embodiment by referring to FIG. 8 which is a flow chart showing the operation of the control part 15 shown in FIG. 3 for controlling the parts 11 through 14. For the sake of convenience, it is assumed that the condition (IIIa) described above is used as the condition for detecting the dot region in the dot region detecting part 13. In addition, it is assumed that the document image which is scanned comprises a dot region and a line region and does not include a continuous gradation region such as a continuous gradation photograph.

In a step S1, the input image processing part 11 stores a quantity of the input image signal amounting to N×3 scan lines which is required to discriminate the dot region in the latter process. For example, in a case where N=9 for the block B which comprises N × N picture elements, the quantity of input image signal which is stored amounts to N × 3 = 9 × 3 = 27 scan lines.

In a step S2, the extreme point detecting part 12 successively applies the matrix shown in FIG. 4A which comprises 3×3 picture elements to each of the picture elements making up the input image signal (image data) stored in the input image processing part 11. In other words, the step S2 discriminates whether or not the center picture element $m_0$ of the matrix is an extreme point of the density change based on the extreme point detection conditions (I) and (II) with respect to all of the picture elements of the 27 scan lines.

After the extreme point detection in the step S2 is finished with respect to all of the picture elements, the dot region detecting part 13 in steps S3 through S11 discriminates whether or not each picture element belongs to a dot region based on the dot detection condition (IIIa), and the region discrimination signal output part 14 outputs the discrimination signal.

In the step S3, the image which is detected of the extreme points is divided into the blocks B each comprising 9×9 picture elements as shown in FIG. 5. The number of extreme points corresponding to the peaks and the number of extreme points corresponding to the valleys are counted for each block B, and the larger number of extreme points is set as the number P of extreme points in that block B. For example, when the number of peaks is larger than the number of valleys in the block B, the number of peaks is set as the number P of extreme points in that block B.

Figure 6:
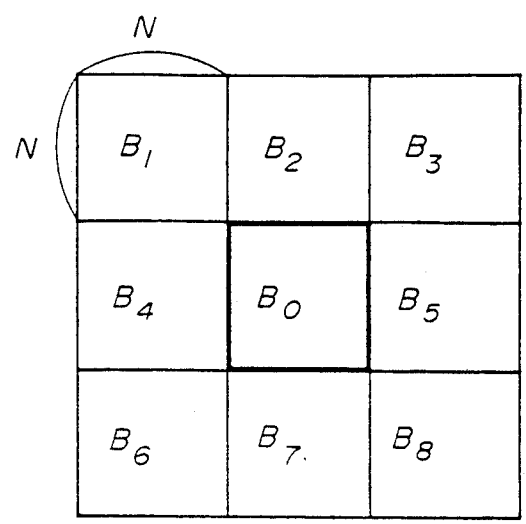
FIG. 6 shows a relationship of an object block and surrounding blocks.
Figure 9:
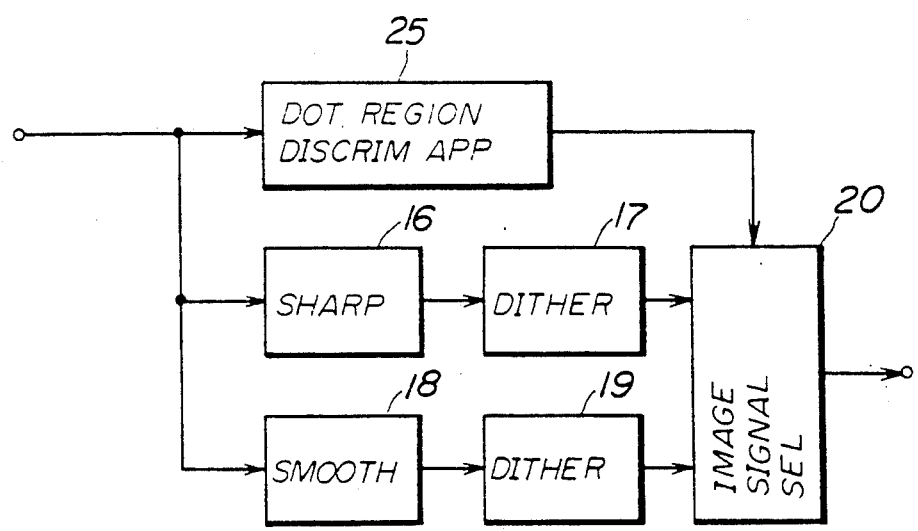
FIG. 9 is a system block diagram showing an embodiment of a copying machine which is applied with the first embodiment.

Then, in the step S4, the number (93 B of blocks in which the number P of extreme points is greater than or equal to the predetermined threshold value $P_{TH}$ is obtained for the object block $B_0$ and the surrounding blocks $B_1$ through $B_8$ shown in FIG. 6. The step S5 discriminates whether or not the number 93 B of blocks is greater than or equal to the predetermined threshold value $B_{TH}$. When the number 93 B of blocks is greater than or equal to the predetermined threshold value $B_{TH}$ and the discrimination result of the step S5 is YES, it is discriminated that the center picture element $n_0$ of the object block $B_0$ shown in FIG. 5 belongs to a dot region and the process advances tot eh step S6. On the other hand, when the discrimination result in the step S5 is NO, it is discriminated that the center picture element $n_0$ of the object block $B_0$ shown in FIG. 5 does not belong to a dot region and the process advances to the step S7.

In steps S6 and S7, the region discrimination signal output part 14 receives the result of the detection made by the dot region detecting part 13 and outputs the discrimination signal which indicates whether the center picture element $n_0$ belongs to a dot region or a line region.

Next, the step S8 discriminates whether or not the process of discriminating the dot region is finished for N×3 scan lines. The process returns to the step S3 when the discrimination result in the step S8 is NO. When the discrimination result in the step S8 is YES, the step S9 discriminates whether or not the process of discriminating the dot region from the line region is finished for all the picture elements of the document image. The process returns to the step S1 when the discrimination result in the step S9 is NO. On the other hand, the process is ended when the discrimination result in the step S9 is YES.

In this embodiment, the matrix which comprises M × M picture elements and is used for the extreme point detection pattern is a matrix comprising 3×3 picture elements, and the block which comprises N × N picture elements and is used for the dot detection pattern is a block comprising 9 ×9 picture elements. However, the values of M and N may be set to other arbitrary values. For example, N > M.

As described, it is assumed in this embodiment that the document image which is scanned comprises a dot region and a line region and does not include a continuous gradation region such as a continuous gradation photograph. But in actual practice, there are cases where a continuous gradation region such as a continuous gradation photograph or picture coexists with the dot region and the line region in the document image. In such cases, the input image signal is first differentiated to eliminate the continuous gradation region using the edge density, and the present invention is thereafter applied. For example, the method proposed in a Japanese Laid-Open Patent Application No. 58—115975 maybe used to eliminate the continuous gradation region. Therefore, it becomes possible to discriminate the dot region, the character region and the continuous gradation region from each other.

FIG. 8 shows an embodiment of a copying machine applied with the first embodiment. In FIG. 8, the copying machine generally comprises a sharpening circuit 16 for sharpening the character region, a Bayer type dither circuit 17 for sharpening the characters or the like by attaching importance to the resolution, a smoothing circuit 18 for smoothing the dot region, an eddy type dither circuit 19 for processing the halftones such as the dot photograph, an image signal selection circuit 20 for selectively outputting one of the output signals of the dither circuits 17 and 19 responsive to the discrimination signal from a region discriminating apparatus 25. This region discriminating apparatus 25 corresponds to the dot region discriminating apparatus shown in FIG. 3.

The region discriminating apparatus 25 discriminates whether or not the picture element of the input image signal belongs to the dot region for each picture element of the input image signal. The discrimination signal which is indicative of the discrimination result is supplied from the region discriminating apparatus 25 to the image signal selection circuit 20. The image signal selection circuit 20 selectively outputs the output image signal of the dither circuit 17 when the discrimination signal indicates that the picture element does not belong to the dot region, and selectively outputs the output image signal of the dither circuit 19 when the discrimination signal indicates that the picture element belongs to the dot region.

Therefore, the image signal of the character or the like which is subjected to the sharpening process and obtained from the dither circuit 17 is output from the image signal selection circuit 20 in the line region. On the other hand, the image signal of the dot photograph or the like which is subjected to the halftone process and obtained from the dither circuit 19 is output from the image signal selection circuit 20 in the dot region. Accordingly, when the image signal output from the image signal selection circuit 20 is reproduced on the copying machine after being subjected to an appropriate process, it is possible to reproduce a binary image of a high quality in which the line image such as the character is sharpened and the dot image such as the dot photograph is made natural by the halftone process.

According to the first embodiment, the extreme points of the picture elements of the digital multilevel input image signal are detected using the local two dimensional extreme point detection pattern, and the dot region is detected using the local two dimensional dot detection pattern based on the result of the detection of the extreme points. As a result, the dot region can be discriminated from other regions with a high accuracy compared to the conventional method. The accurate discrimination of the dot region is possible even when the dot region occupies a large or small area of the document image or when a skew of the document occurs and the screen angle shifts from the horizontal direction.

Figure 10A:
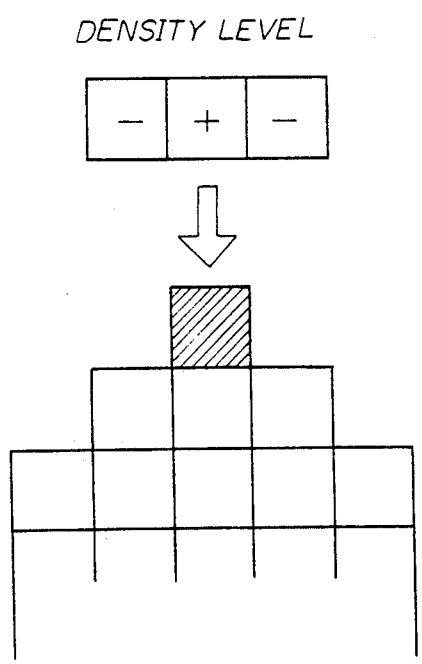
FIGS. 10A and 10B are diagrams for explaining the problems of the first embodiment.
Figure 10B:
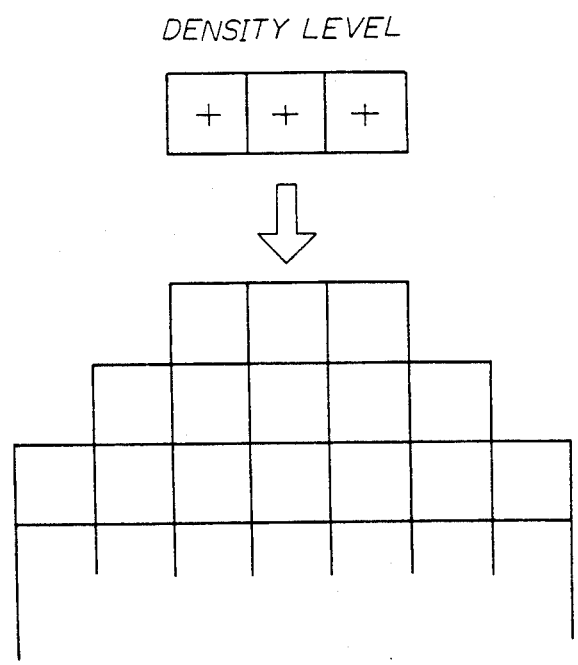

The first embodiment uses the two dimensional extreme point detection pattern and the two dimensional dot detection pattern to discriminate the dot region. But in general, the number of lines of the dots range from 65 lines for the coarse dots to 200 lines for the fine dots. However, a problem occurs when the extreme points of the dot region is detected by use of a matrix having the same size for the dots with any number of lines within the above described range. For example, when the document image is read at 400 dot/inch and the extreme points are detected using a matrix which comprises $3 \times 3$ picture elements, a vertex portion of the dot region which has a large number of lines such as 200 lines becomes a sharp triangle having a single picture element at the vertex as shown in FIG. 10A. In this case, it is possible to extract the extreme point (picture element indicated by a hatching) from the density differences with the surrounding picture elements. But in the case of the dot region which has a smaller number of lines such as 65 and 85 lines, a vertex portion of the dot region becomes a trapezoidal shape having a plurality of picture elements at the vertex as shown in FIG. 10B. In this case, it is impossible to extract the extreme point from the density differences with the surrounding picture elements. In order to overcome this problem, the matrix which is used to detect the extreme points must have an optimum size depending on the area of the document image occupied by the dot region.

Next, a description will be given of embodiments of the dot region discriminating method according to the present invention in which the above described problem is eliminated.

According to a second embodiment of the dot region discriminating method according to the present invention, the digital multilevel input image signal is smoothened with a predetermined weighting coefficient. Generally, extreme points appear regularly in a dot region such as a dot photograph, but the extreme points in a line region such as a character do not appear regularly. For this reason, the density of the extreme points in regions other than the dot region can be averaged and reduced by carrying out a smoothing process with respect to the digital multilevel input image signal which describes a document image in which the dot region and the other regions coexist. As a result, the density difference between the dot region and the other regions is increased and it becomes possible to accurately detect the extreme points of the dot region regardless of whether the dot region occupies a large or small area of the document image.

In addition, this embodiment obtains a synthetic image by taking a logical sum of the extreme points detected from the smoothened input image signal and the extreme points detected from the original digital multilevel input image signal. Thus, the difference between the number of extreme points detected in the dot region and the number of extreme points detected in other regions becomes large. As a result, it is possible to accurately discriminate the dot region from other regions by discriminating whether or not each picture element of the input document image belongs to the dot region by use of the number of extreme points in the synthetic image.

A description will now be given of the second embodiment of the dot region discriminating method according to the present invention, by referring to FIG. 11 which shows a dot region discriminating apparatus applied with the second embodiment. In FIG. 11, those parts which are the same as those corresponding parts in FIG. 3 are designated by the same reference numerals, and a description thereof will be omitted.

For the sake of convenience, a description will be given of a case where an image to be processed is a black-and-white document image. When applying the present invention to a color image, the original color image is separated into three primary color signals of red, green and blue (RGB) or yellow, magenta and cyan (YMC) depending on the display format such as a cathode ray tube (CRT) display and a printing display of the reproduced image as described before for the first embodiment.

In FIG. 11, the input image processing part 11 stores the input image signal amounting to N×3 scan lines in line memories (not shown), where N denotes the number of picture elements which determines a unit block B comprising N × N picture elements for detecting the dot region in a latter process.

A smoothing part 32 comprises a smoothing filter for smoothing the digital multilevel input image signal which is received from the input image processing part 11 with a predetermined weighting coefficient, so as to average the luminance level of the document image. For example, the smoothing filter employs the following matrix which comprises 3 ×3 picture elements with a weighting coefficient "1" assigned to each picture element.

$$1/9 \times \begin{bmatrix} 1 & 1 & 1 \\ 1 & 1 & 1 \\ 1 & 1 & 1 \end{bmatrix}$$

A delay part 33 delays the digital multilevel input image signal which is received from the input image processing part 11 by a predetermined time which is required to carry out the smoothing process in the smoothing part 32. Hence, the smoothened input digital signal which is supplied to an extreme point detecting part 34 from the smoothing part 32 is synchronized to the input digital signal which is supplied to an extreme point detecting part 35 from the delay part 33.

The extreme point detecting parts 34 and 35 carry out the same process as the extreme point detecting part 12 described before. However, the extreme point detecting part 34 detects the extreme points in the image which is described by the smoothened input image signal, while the extreme point detecting part 35 detects the extreme points in the image which is described by the input image signal.

A dot region detecting part 13A first obtains a synthetic image by taking a logical sum of the extreme points detected from the smoothened input image signal and the extreme points detected from the input image signal, and then detects the dot region by a process identical to that of the dot region detecting part 13 described before.

Figure 12:
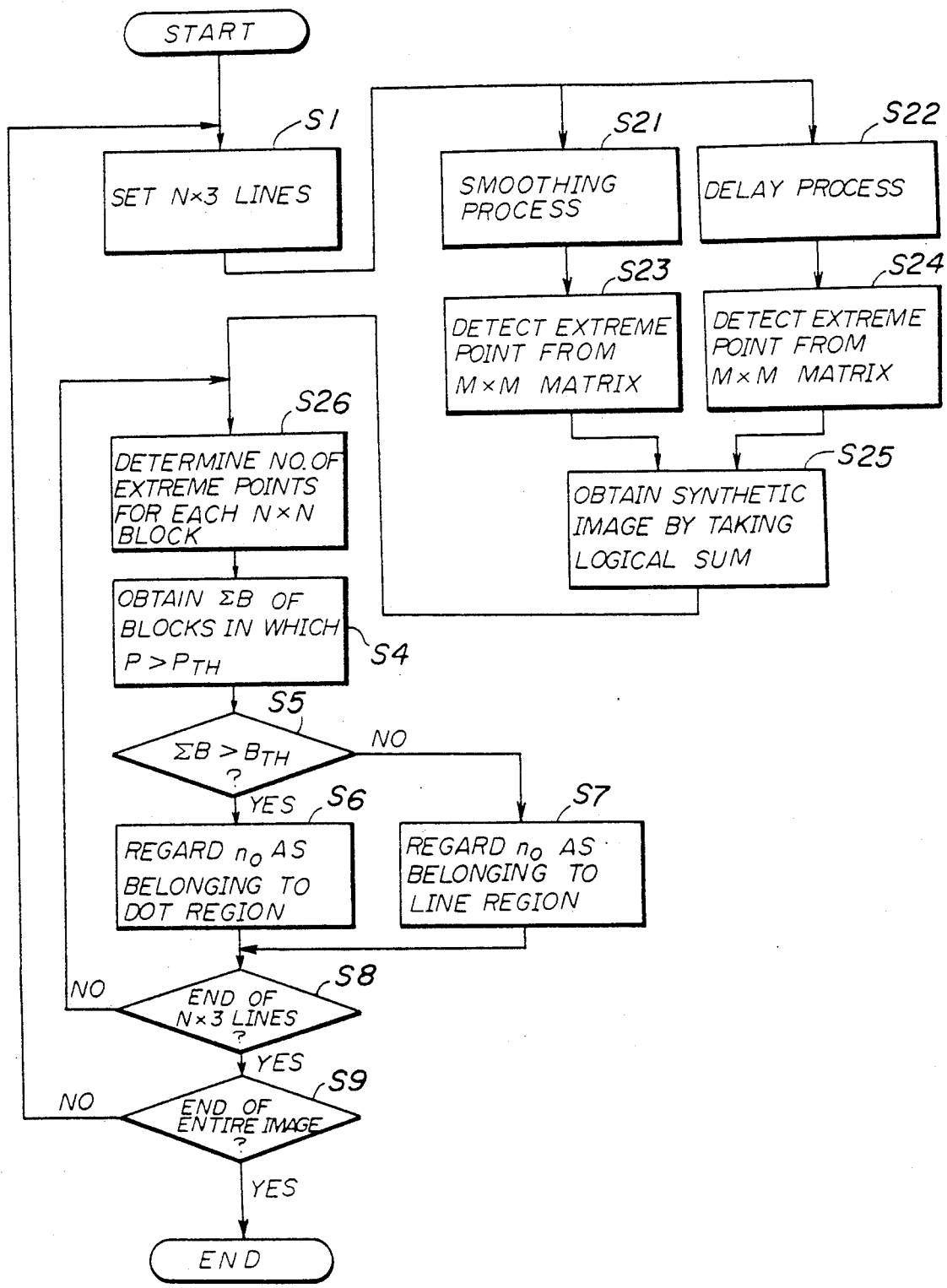
FIG. 12 is a flow chart for explaining an embodiment of an operation of the control part shown in FIG. 11.

Next, a description will be given of the operation of this embodiment by referring to FIG. 12 which is a flow chart showing the operation of the control part 15 shown in FIG. 11 for controlling the parts 11, 13A, 14, 32, 33, 34 and 35. In FIG. 12, those steps which are substantially the same as those corresponding steps shown in FIG. 8 are designated by the same reference numerals, and a description thereof will be omitted. For the sake of convenience, it is assumed that the condition (IIIa) described before is used as the condition for detecting the dot region in the dot region detecting part 13A. In addition, it is assumed that the document image which is scanned comprises a dot region and a line region and does not include a continuous gradation region such as a continuous gradation photograph.

In a step S21, the smoothing part 32 smoothens the input image signal which is received from the input image processing part 11. At the same time, a step S22 delays the input image which is received from the input image processing part 11 by the predetermined time which is required to carry out the smoothing process. In a step S23, the extreme point detecting part 34 successively applies the matrix shown in FIG. 4A which comprises 3×3 picture elements to each of the picture elements making up the smoothened input image signal received from the smoothing part 32. In other words, the step S23 discriminates whether or not the center picture element $m_0$ of the matrix is an extreme point of the density change based on the extreme point detection conditions (I) and (II) with respect to all of the picture elements of the 27 smoothened scan lines. At the same time, in a step S24, the extreme point detecting part 35 successively applies the matrix shown in FIG. 4A which comprises 3×3 picture elements to each of the picture elements making up the input image signal (image data) which is received from the delay part 33. The processes carried out by these steps S23 and S24 are identical to that of the step S2 described before.

Then, in a step S25, the dot region detecting part 13A obtains the synthetic image by taking the logical sum of the extreme points detected from the smoothened input image signal and the extreme points detected from the input image signal. A step S26 divides the synthetic image into the blocks B each comprising 9×9 picture elements as shown in FIG. 5. The number of extreme points corresponding to the peaks and the number of extreme points corresponding to the valleys are counted for each block B, and the larger number of extreme points is set as the number P of extreme points in that block B. For example, when the number of peaks is larger than the number of valleys in the block B, the number of peaks is set as the number P of extreme points in that block B. This step S26 is the same as the step S3 is described before in conjunction with FIG. 8 except that the step S26 carries out the process with respect to the synthetic image which is obtained in the step S25.

The description of the remaining steps S4 through S9 will be omitted.

In this embodiment, the values of M and N may be set to other arbitrary values. For example, N > M as in the case of the first embodiment described before.

It is not essential that the extreme point detecting parts 34 and 35 employ the same extreme point detection condition, as will be described later in conjunction with a third embodiment of the dot region discriminating method according to the present invention.

This second embodiment is also applicable to the copying machine shown in FIG. 8. In this case, the region discriminating apparatus 25 corresponds to the dot region discriminating apparatus shown in FIG. 11.

According to the second embodiment, the extreme points of the picture elements of the digital multilevel input image signal and the extreme points of the picture elements of the smoothened digital multilevel input image signal are detected using the local two dimensional extreme point detection pattern, a synthetic image is obtained by taking a logical sum of the extreme points detected from the smoothened input image signal and the extreme points detected from the input image signal, and the dot region is detected using the local two dimensional dot detection pattern based on the result of the detection of the extreme points detected from the synthetic image. As a result, the dot region can be discriminated with ease from other regions with a high accuracy regardless of whether the dot region occupies a large or small area of the document image.

Next, a description will be given of a third embodiment of the dot region discriminating method according to the present invention. According to this embodiment, the extreme points are independently detected from the digital multilevel input image signal using first and second extreme point detection conditions, so that the dot region can be discriminated with ease from other regions with a high accuracy regardless of whether the dot region occupies a large or small area of the document image.

Figure 13:
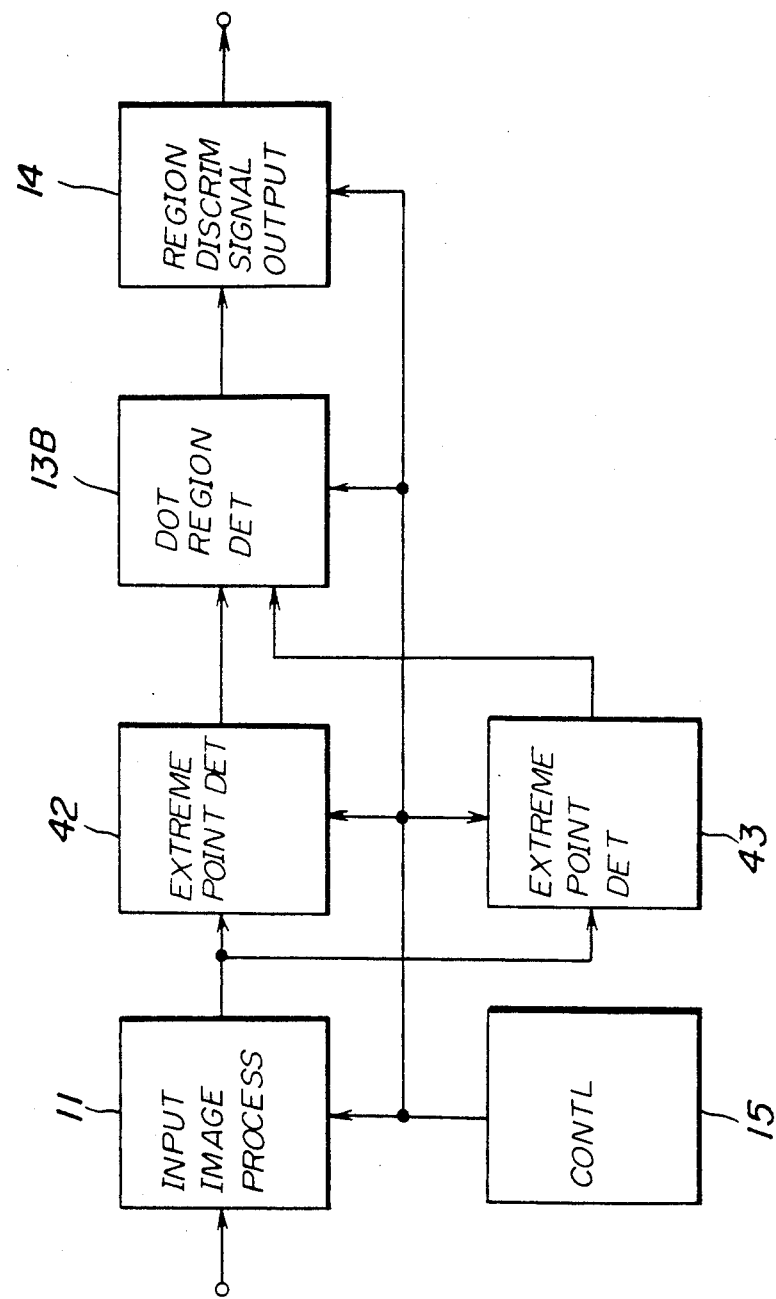
FIG. 13 is a system block diagram showing an embodiment of the dot region discriminating apparatus applied with a third embodiment of the method.

FIG. 13 shows a dot region discriminating apparatus applied with the third embodiment. In FIG. 13, those parts which are the same as those corresponding parts in FIG. 3 are designated by the same reference numerals, and a description thereof will be omitted.

For the sake of convenience, a description will be given of a case where an image to be processed is a black-and-white document image. When applying the present invention to a color image, the original color image is separated into three primary color signals of red, green and blue (RGB) or yellow, magenta and cyan (YMC) depending on the display format such as a cathode ray tube (CRT) display and a printing display of the reproduced image as described before the first embodiment.

In FIG. 13, the input image processing part 11 stores the input image signal amounting to N×3 scan lines in line memories (not shown), where N denotes the number of picture elements which determines a unit block B comprising N × N picture elements for detecting the dot region in a latter process.

Extreme point detecting parts 42 and 43 respectively receive the input image signal (digital multilevel signal) from the input image processing part 11 and successively apply a predetermined matrix comprising M × M picture elements with respect to each picture element described by the input image signal, where the value of M is selected to values which are different between the extreme point detecting parts 42 and 43. The extreme point detecting parts 42 and 43 respectively detect whether or not a center picture element $m_0$ of the predetermined M × M matrix is an extreme point which indicates a peak or valley of the density change based on the density relationships with surrounding picture elements $m_1$ through $m_i$, where $i = M^2 - 1$.

The extreme point detecting part 42 detects the extreme point which indicates the peak or valley of the density change by use of a two dimensional extreme point detection pattern in which the following condition (Ia) must be satisfied.

Condition (Ia): Within the matrix comprising M × M picture elements as shown in FIG. 4A for the case where M=3, the center picture element $m_0$ is an extreme point when the density level of the center picture element $m_0$ is a predetermined threshold value $\alpha$ greater than or a predetermined threshold value $\beta$ smaller than the density levels of the surrounding picture elements $m_1$ through $m_i$, that is, $m_0 > m_i + \alpha$ or $m_0 < m_i - \beta$, where $i = 1, 2, ...$ .

The extreme point detecting part 43 detects the extreme point which indicates the peak or valley of the density change by use of a two dimensional extreme point detection pattern in which the following condition (IIa) or (IIb) must be satisfied.

Figures 14A, 14B:
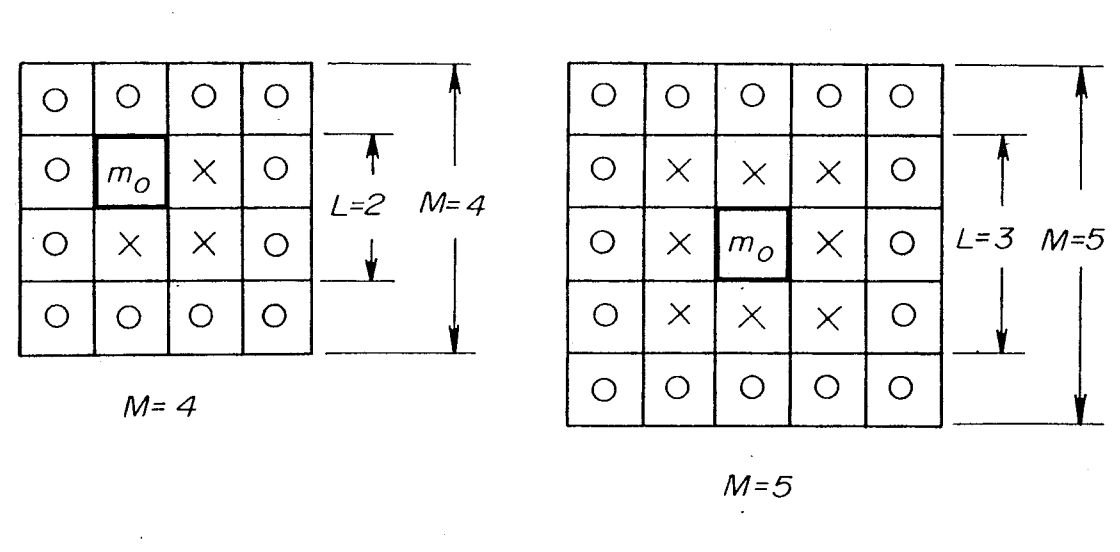

Condition (IIa): Within the matrix comprising M × M picture elements as shown in FIGS. 14A and 14B for the respective cases where M=4 and M=5, the center picture element $m_0$ is an extreme point when the density level of the center picture element $m_0$ is greater than or equal to the density levels of all other picture elements indicated by "X" which are within a region of L × L picture elements including the center picture element $m_0$, and the density level of the center picture element $m_0$ is a predetermined threshold value $\Delta m_{TH1}$ greater than or equal to the density levels of the other picture elements indicated by "O" which are outside the region comprising L × L picture element and inside a region comprising M × M picture elements, where L<M.

Condition (IIb): Within the matrix comprising M × M picture elements as shown in FIGS. 14A and 14B for the respective cases where M=4 and M=5, the center picture element $m_0$ is an extreme point when the density level of the center picture element $m_0$ is less than or equal to the density levels of all other picture element syndicated by "X" which are within a region of L × L picture elements including the center picture element $m_0$, and the density level of the center picture element $m_0$ is a predetermined threshold value $\Delta m_{TH1}$ less than or equal to the density levels of the other picture elements indicated by "O" which are outside the region comprising L × L picture elements and inside a region comprising M × M picture elements, where L<M.

A dot region detecting part 13B first obtains a synthetic image by taking a logical sum of the extreme points detected from the input image signal in the extreme point detecting part 42 and the extreme points detected from the input image signal in the extreme point detecting part 43, and then detects the dot region by a process identical to that of the dot region detecting part 13 described before.

A description of the region discrimination signal output part 14 will be omitted. The control part 15 controls the operation sequence of the parts 11, 13B, 14, 42 and 43.

Next, a description will be given of the operation of this embodiment by referring to FIG. 15 which is a flow chart showing the operation of the control part 15 shown in FIG. 13 for controlling the parts 11, 13B, 14, 42 and 43. In FIG. 15, those steps which are substantially the same as those corresponding steps shown in FIG. 8 are designated by the same reference numerals, and a description thereof will be omitted. For the sake of convenience, it is assumed that the condition (Ia) described before is used as the condition for detecting the extreme points in the extreme point detecting part 42, the condition (IIa) described before is used as the condition for detecting the extreme points in the extreme point detecting part 43, and the condition (IIIa) described before is used as the condition for detecting the dot region in the dot region detecting part 13B. In addition, it is assumed that the document image which is scanned comprises a dot region and a line region and does not include a continuous gradation region such as a continuous gradation photograph.

In a step S31, the extreme point detecting part 42 successively applies the matrix comprising 3 × 3 picture elements with respect to each picture element described by the input image signal, and detects whether or not a center picture element $m_0$ of the 3×3 matrix is an extreme point which indicates a peak or valley of the density change based on the extreme point detection condition (Ia). Hence, it is possible to detect the extreme points of fine dots having 85 or more lines by the extreme point detection process of the extreme point detecting part 42. At the same time, in a step S32, the extreme point detecting part 43 successively applies the matrix shown in FIG. 14B comprising 5×5 picture elements with respect to each picture element described by the input image signal, and detects whether or not a center picture element $m_0$ of the 5×5 matrix is an extreme point which indicates a peak or valley of the density change based on the extreme point detection condition (IIa). Hence, it is possible to detect the extreme points of coarse dots having 85 or less lines by the extreme point detection process of the extreme point detecting part 43. In a step S33, the dot region detecting part 13B obtains the synthetic image by taking the logical sum of the extreme points detected in the extreme point detecting part 42 and the extreme points detected in the extreme point detecting part 43. A step S34 divides the synthetic image into the blocks B each comprising 9×9 picture elements as shown in FIG. 5. The number of extreme points corresponding to the peaks and the number of extreme points corresponding to the valleys are counted for each block B, and the larger number of extreme points is set as the number P of extreme points in that block B. For example, when the number of peaks is larger than the number of valleys in the block B, the number of peaks is set as the number P of extreme points in that block B. This step S34 is the same as the step S3 is described before in conjunction with FIG. 8 except that the step S34 carries out the process with respect to the synthetic image which is obtained in the step S33.

The description of the remaining steps S4 through S9 will be omitted.

In this embodiment, the values of M, L and N may be set to other arbitrary values as long as the relationships L < M and N > M are satisfied.

This third embodiment is also applicable to the copying machine shown in FIG. 8. In this case, the region discriminating apparatus 25 corresponds to the dot region discriminating apparatus shown in FIG. 13.

According to the third embodiment, the extreme points of the picture elements of the digital multilevel input image signal are detected independently using two kinds of local two dimensional extreme point detection patterns, a synthetic image is obtained by taking a logical sum of the extreme points detected from the input image signal using the two extreme point detection patterns, and the dot region is detected using the local two dimensional dot detection pattern based on the result of the detection of the extreme points detected from the synthetic image. As a result, the dot region can be discriminated with ease from other regions with a high accuracy regardless of whether the dot region occupies a large or small area of the document image.

Next, a description will be given of a fourth embodiment of the dot region discriminating method according to the present invention. A dot region discriminating apparatus applied with the fourth embodiment has a construction identical to that shown in FIG. 3, and an operation of the control part 15 is basically the same as that shown in the flow chart of FIG. 8. Therefore, only the features of the fourth embodiment which differ from those of the first embodiment will be described by referring to FIGS. 3 and 8.

According to this embodiment, the extreme points of the picture elements of the digital multilevel input image signal are detected by the extreme point detecting part 12 using conditions which are different from the conditions (I) and (II).

The extreme point detecting part 12 detects the extreme point which indicates the peak or valley of the density change by use of a two dimensional extreme point detection pattern in which both the following conditions (Ic) and (IIc) must be satisfied simultaneously.

Condition (Ic): Within the matrix comprising M × M picture elements, the center picture element $m_0$ is an extreme point when the density level of the center picture element $m_0$ is greater than or less than the density levels of the surrounding picture elements $m_1$ through $m_i$, that is, $m_0 > m_1 \sim m_i$ or $m_0 < m_1 \sim m_i$.

Condition (IIc): Within the matrix comprising M × M picture elements, the center picture element $m_0$ is an extreme point when an absolute value of a density difference between the density level of the center picture element $m_0$ and an average value of the density levels of two picture elements $m_a$ and $m_b$ which are located at symmetrical positions about the center picture element $m_0$ is greater than or equal to a predetermined threshold value $\Delta m_{TH}$, that is, $|2m_0 - m_a - m_b| \geq \Delta m_{TH}$. Examples of the picture elements $m_a$ and $m_b$ are the picture elements $m_1$ and $m_8$ in FIG. 4A and the picture elements $m_3$ and $m_{22}$ in FIG. 4C.

Hence, the following are examples of the condition (IIc) for the matrix shown n FIG. 4A which comprises 3×3 picture elements.

$|2m_0 - m_1 - m_8| \geq \Delta m_{TH}$ $|2m_0 - m_2 - m_7| \geq \Delta m_{TH}$ $|2m_0 - m_3 - m_6| \geq \Delta m_{TH}$ $|2m_0 - m_4 - m_5| \geq \Delta m_{TH}$ On the other hand, the following are examples of the condition (IIc) for the matrix shown FIG. 4C which comprises 5×5 picture elements.

$|2m_0 - m_3 - m_{22}| \geq \Delta m_{TH}$ $|2m_0 - m_8 - m_{17}| \geq \Delta m_{TH}$ $|2m_0 - m_1 - m_{24}| \geq \Delta m_{TH}$ $|2m_0 - m_7 - m_{18}| \geq \Delta m_{TH}$ Therefore, this embodiment only differs from the first embodiment in that the step S2 shown in FIG. 8 detects the extreme points using the two dimensional extreme point detection pattern in which both the above described conditions (Ic) and (IIc) are satisfied simultaneously. The rest of the operation is identical to that of the first embodiment.

This fourth embodiment is also applicable to the copying machine shown in FIG. 8.

According to the fourth embodiment, the extreme points of the picture elements of the digital multilevel input image signal are detected using the local two dimensional extreme point detection pattern, and the dot region is detected using the local two dimensional dot detection pattern based on the result of the detection of the extreme points. As a result, the dot region can be discriminated from other regions with a high accuracy compared to the conventional method. The accurate discrimination of the dot region is possible even when the dot region occupies a large or small area of the document image or when a skew of the document occurs and the screen angle shifts from the horizontal direction. In addition, the detection of the dot region is less affected by digital noise when compared with the first embodiment because the conditions (Ic) and (IIc) are used in place of the conditions (I) and (II).

The first and fourth embodiments use the two dimensional extreme point detection pattern and the two dimensional dot detection pattern to discriminate the dot region. But in general, the fine characters of the document have a size of 1.75 mm × 1.75 mm, for example, and the lines may be dense at a portion of the character depending on the character. Furthermore, depending on the written state of the characters on the document, the characters may be light at some portions and dark at other portions. In such portions, the line region may have a pattern similar to that of the dot region, and it is difficult to discriminate the dot region from the line region with a high accuracy.

Next, a description will be given of a fifth embodiment of the dot region discriminating method according to the present invention in which the above described problem is eliminated.

A dot region discriminating apparatus applied with the fifth embodiment has a construction identical to that shown in FIG. 3. Therefore, the fifth embodiment will be described by referring to FIG. 3.

For the sake of convenience, a description will be given of a case where an image to be processed is a black-and-white document image. When applying the present invention to a color image, the original color image is separated into three primary color signals of red, green and blue (RGB) or yellow, magenta and cyan (YMC) depending on the display format such as a cathode ray tube (CRT) display and a printing display of the reproduced image. Then, the dot region discriminating method according to the present invention is used with respect to each of the separated primary colors.

In FIG. 3, an input image signal is generated by making a raster scan of a document image in which a dot image such as a dot photograph and a line image such as a character coexist. This input image signal is a digital multilevel signal including a luminance signal which corresponds to the density level. The input image processing part 11 stores a quantity of the received input image signal at least amounting to a predetermined number of scan lines which are required to discriminate the dot region in a latter process. For example, the input image signal amounting to N×3 scan lines are stored in line memories (not shown), where N denotes a number of picture elements which determines a unit block B comprising N×N picture elements for detecting the dot region in a latter process.

The extreme point detecting part 12 receives the input image signal (digital multilevel signal) from the input image processing part 11 and successively applies a predetermined matrix comprising M×M picture elements with respect to each picture element described by the input image signal. For example, the predetermined matrix is a matrix comprising 3×3 picture elements (M=3) as shown in FIG. 4A, a matrix comprising 4×4 picture elements (M=4) as shown in FIG. 4B, or a matrix comprising 5×5 picture elements (M=5) as shown in FIG. 4C. The extreme point detecting part 12 detects whether or not a center picture element $m_0$ of the predetermined M×M matrix is an extreme point which indicates a peak or valley of the density change based on the density relationships with surrounding picture elements $m_1$ through $m_i$, where $i=M^2-1$.

Figure 16:
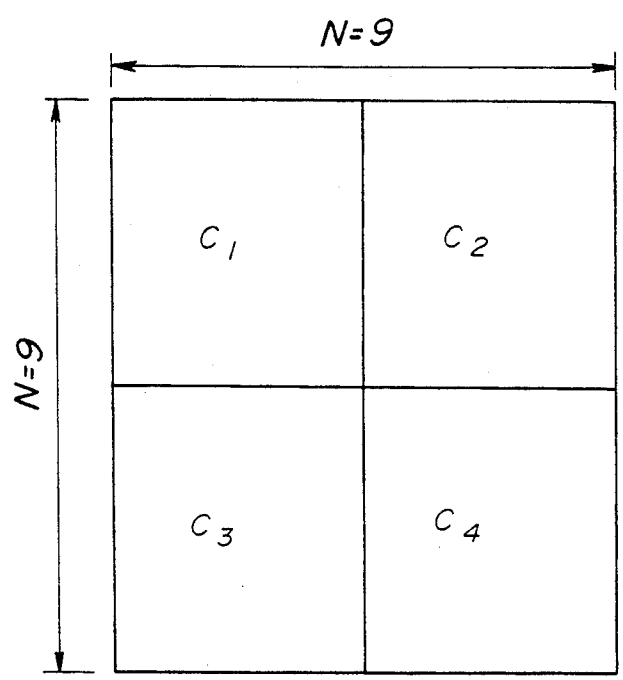
FIG. 16 is a digram for explaining regions of a block which comprises four regions in correspondence with FIG. 5 for explaining a fifth embodiment of the dot region discriminating method according to the present invention.

The dot region detecting part 13 divides the image which is described by the input image signal into blocks B each comprising N×N picture elements, subdivides each block B into a plurality of small regions $C_i$, and counts the number of extreme points indicating the peaks and the number of extreme points indicating the valleys for each small region $C_i$ of each block B. FIG. 5 shows a case where N=9 and the block B comprises 9×9 picture elements, and FIG. 16 shows a case where i=4 and each block is subdivided into four small regions $C_1$, $C_2$, $C_3$ and $C_4$. The dot region detecting part 13 discriminates whether or not a predetermined picture element within an object block $B_0$ shown in FIG. 6 belongs to the dot region, based on the relationship between a number $P_0$ of extreme points of the object block $B_0$ and numbers $P_1$ through $P_8$ of extreme points of surrounding blocks $B_1$ through $B_8$.

The region discrimination signal output part 14 outputs a discrimination signal which indicates whether each picture element belongs to the dot region or the line region based on the result of the detection made in the dot region detecting part 13.

The control part 15 controls the operation sequence of the parts 11, 12, 13 and 14.

The extreme point detecting part 12 detects the extreme point which indicates the peak or valley of the density change by use of the two dimensional extreme point detection pattern in which both the following conditions (I) and (II) must be satisfied simultaneously.

Condition (I): Within the matrix comprising M×M picture elements, the center picture element $m_0$ is an extreme point when the density level of the center picture element $m_0$ is a maximum or a minimum compared to the density levels of the surrounding picture elements $m_1$ through $m_i$, that is, $m_0 > m_1 \sim m_i$ or $m_0 < m_1 \sim m_i$.

Condition (II): Within the matrix comprising M×M picture elements, the center picture element $m_0$ is an extreme point when an absolute value of a density difference $\Delta m$ between the density levels of the center picture element $m_0$ and each of the surrounding picture elements $m_1$ through $m_i$ is greater than or equal to a predetermined threshold value $\Delta m_{TH}$, that is, $|\Delta m| > \Delta m_{TH}$. The surrounding picture elements $m_1$ through $m_i$ are respectively located in a specific direction (right, left, up, down or 45° angle) from the center picture element $m_0$ as indicated by arrows in FIGS. 7A, 7B and 7C for cases where M=3, M=4 and M=5.

As described above, generally, a large number of extreme points exist in a character region similarly to the dot region. For this reason, it is difficult to detect only the extreme points of the dot region solely from the condition (I), and the extreme points of the dot region are thus detected by using both the conditions (I) and (II). These conditions (I) and (II) are identical to the conditions (I) and (II) described before in conjunction with the first embodiment.

In the dot region detecting part 13, the following extreme point detection condition (IIIe) is used to determine the number P of extreme points of each block B based on the number of extreme points of the small regions $C_1$ through $C_4$.

Condition (IIIe): When a number q of extreme points is obtained for each of the small regions $C_1$ through $C_4$ within the block B which comprises $N \times N$ picture elements as shown in FIG. 5 with respect to both the peak and valley, the number P of extreme points of this block B is regarded as $P=0$ if a number Q of small regions $C_i$ in which $q=0$ is greater than or equal to a predetermined value $Q_{TH}$. On the other hand, if the number Q of small regions $C_i$ in which $q=0$ is less than the predetermined value $Q_{TH}$, a sum of the numbers q of extreme points of the small regions $C_1$ through $C_4$ is obtained for the peaks and for the valleys, and the larger sum $\Sigma q$ is regarded as the number P of extreme points of this block B.

The dot region detecting part 13 detects the dot region by use of the two dimensional dot region detection pattern in which one of the following conditions (IIIa), (IIIb), (IIIc) and (IIId) is satisfied, based on the number P of extreme points of each block B detected in the extreme point detecting part 12. One of the conditions (IIIa), (IIIb), (IIIc) and (IIId) is used depending on the reproduction. The condition (IIIa) or (IIIb) is used when carrying out the process by moving the block B comprising $N \times N$ picture elements one picture element at a time. The condition (IIIc) or (IIId) is used when carrying out the process by moving the block B comprising $N \times N$ picture elements one block at a time.

Condition (IIIa): In the object block $B_0$ and the surrounding blocks $B_1$ through $B_8$ shown in FIG. 6, the center picture element $n_0$ of the object block $B_0$ shown in FIG. 5 is regarded as the dot region when a number $\Sigma B$ of blocks in which the number P of extreme points is greater than or equal to a predetermined threshold value $P_{TH}$ is greater than or equal to a predetermined threshold value $B_{TH}$, that is, when [the number $\Sigma B$ of blocks in which $P > P_{TH}] > B_{TH}$.

Condition (IIIb): In the object block $B_0$ and the surrounding blocks $B_1$ through $B_8$ shown in FIG. 6, the center picture element $n_0$ of the object block $B_0$ shown in FIG. 5 is regarded as the dot region when a sum total $\Sigma |\Delta P|$ of absolute values of differences $\Delta P$ between the number of extreme points in the object block $B_0$ and the surrounding blocks $B_1$ through $B_8$ is less than or equal to a predetermined threshold value $\Delta P_{TH}$, that is, when $\Sigma |\Delta P| < \Delta P_{TH}$.

Condition (IIIc): In the object block $B_0$ and the surrounding blocks $B_1$ through $B_8$ shown in FIG. 6, all the picture elements $n_0$ through $n_{80}$ within the object block $B_0$ shown in FIG. 5 are regarded as the dot regions when the number $\Sigma B$ of blocks in which the number P of extreme points is greater than or equal to the predetermined threshold value $P_{TH}$ is greater than or equal to the predetermined threshold value $B_{TH}$.

Condition (IIId): In the object block $B_0$ and the surrounding blocks $B_1$ through $B_8$ shown in FIG. 6, all the picture elements $n_0$ through $n_{80}$ within the object block $B_0$ shown in FIG. 5 are regarded as the dot regions when the sum total $\Sigma |\Delta P|$ of absolute values of the differences $\Delta P$ between the number of extreme points in the object block $B_0$ and the surrounding blocks $B_1$ through $B_8$ is less than or equal to the predetermined threshold value $\Delta P_{TH}$.

The above conditions (IIIa), (IIIb), (IIIc) and (IIId) are identical to the conditions (IIIa), (IIIb), (IIIc) and (IIId) described before in conjunction with the first embodiment.

Figure 17:
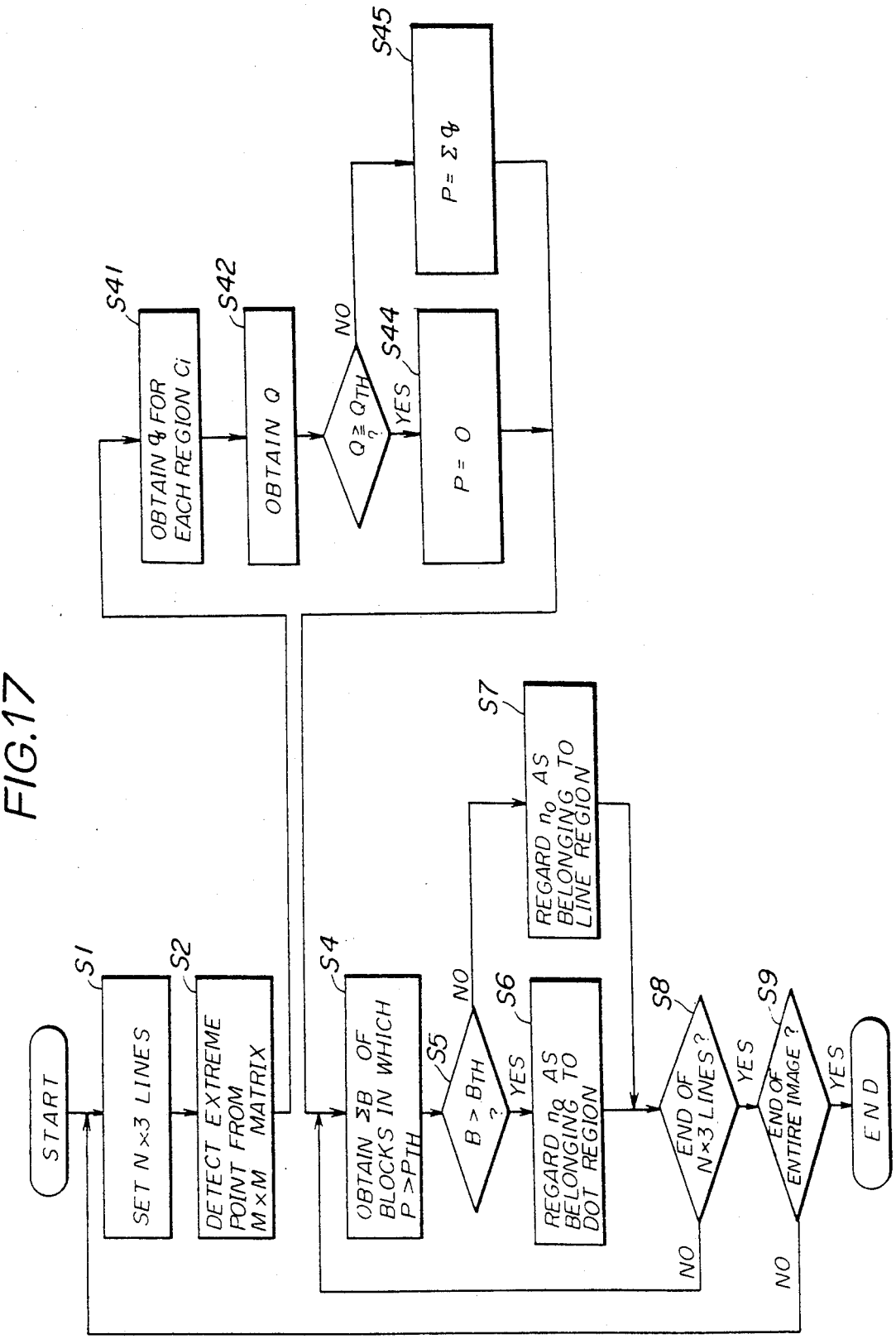
FIG. 17 is a flow chart for explaining an embodiment of an operation of the control part shown in FIG. 3 for explaining the fifth embodiment.

Next, a description will be given of the operation of this embodiment by referring to FIG. 17 which is a flow chart showing the operation of the control part 15 shown in FIG. 3 for controlling the parts 11 through 14. For the sake of convenience, it is assumed that the condition (IIIa) described above is used as the condition for detecting the dot region in the dot region detecting part 13. In addition, it is assumed that the document image which is scanned comprises a dot region and a line region and does not include a continuous gradation region such as a continuous gradation photograph. In FIG. 17, those steps which are substantially the same as those corresponding steps shown in FIG. 8 are designated by the same reference numerals, and a description thereof will be omitted.

In a step S2, the extreme point detecting part 12 successively applies the matrix shown in FIG. 4A which comprises $3 \times 3$ picture elements to each of the picture elements making up the input image signal (image data) stored in the input image processing part 11. In other words, the step S2 discriminates whether or not the center picture element $m_0$ of the matrix is an extreme point of the density change based on the extreme point detection conditions (I) and (II) with respect to all of the picture elements of the 27 scan lines.

After the extreme point detection in the step S2 is finished with respect to all of the picture elements, the dot region detecting part 13 in steps S41 through S45 discriminates whether or not each picture element belongs to a dot region based on the dot detection condition (IIIa), and the region discrimination signal output part 14 outputs the discrimination signal.

In the step S41, each block B is subdivided into the small regions $C_1$ through $C_4$ and the number q of extreme points is obtained for each of the small regions $C_1$ through $C_4$. The step S42 obtains the number Q of small regions $C_i$ in which $q=0$ for each block B with respect to both the peak and valley. The step S43 discriminates whether or not $Q > Q_{TH}$. When the discrimination result in the step S43 is YES, the step S44 sets the number P of extreme points of the block B to $P=0$. On the other hand, when the discrimination result in the step S43 is NO, the step S45 obtains the sum of the numbers q of extreme points of the small regions $C_1$ through $C_4$ for the peaks and for the valleys, and sets the larger sum $\Sigma q$ as the number P of extreme points this block B.

Then, in the step S4, the number $\Sigma B$ of blocks in which the number P of extreme points is greater than or equal to the predetermined threshold value $P_{TH}$ is obtained for the object block $B_0$ and the surrounding blocks $B_1$ through $B_8$ shown in FIG. 6. The description of the steps S5 through S9 will be omitted.

This fifth embodiment is also applicable to the copying machine shown in FIG. 8.

According to the fifth embodiment, the extreme points of the picture elements of the digital multilevel input image signal are detected using the local two dimensional extreme point detection pattern by subdividing each block into small regions, and the dot region is detected using the local two dimensional dot detection pattern based on the result of the detection of the extreme points. As a result, the dot region can be discriminated from other regions with a high accuracy even when the document image includes fine characters or thin characters which have extreme point patterns similar to that of the dot region.

Further, the present invention is not limited to these embodiments, but various variations and modifications may be made without departing from the scope of the present invention.

What is claimed is:

1. A dot region discriminating method for discriminating a dot region of an image which is described by a digital multilevel input image signal, said dot region discriminating method comprising:

(a) an extreme point detecting step for detecting one or a plurality of extreme points from a first local region within the image, each of said extreme points corresponding to a peak or a valley of a density change of a picture element within said first local region, said first local region corresponding to a matrix which comprises M×M picture elements;

(b) a dot region detecting step for detecting whether or not
    (1) one of a center picture element within one of said second local regions of the image or
    (2) one of said second local regions, belongs to a dot region;
  wherein the dot region detecting step is based on a distribution of the extreme points detected within said first local region by said extreme point detecting step, and wherein each of said second local regions corresponds to a block which comprises N×N picture elements; and (c) a discriminating step for discriminating the dot region of the image based on the detection made by said dot region detecting step.

2. The dot region discriminating method as claimed in claim 1 wherein said dot region detecting step includes substeps of independently counting the extreme points which correspond to the peaks in each of blocks which correspond to said second local regions and the extreme points which correspond to the valleys in each of the blocks and determining a larger one of the counted extreme points in each block as the number of extreme points for the block, and said discriminating step discriminates whether or not a predetermined picture element within an object block belongs to the dot region based on a relationship of the number of extreme points of the object block and the numbers of extreme points of the blocks surrounding the object block.

3. The dot region discriminating method as claimed in claim 1 wherein said extreme point detecting step detects that a center picture element within the matrix which corresponds to said first local region is an extreme point when a density level of the center picture element within the matrix is a maximum or a minimum compared to density levels of picture elements surrounding the center picture element within the matrix.

4. The dot region discriminating method as claimed in claim 3 wherein said extreme point detecting step detects that a center picture element within the matrix which corresponds to said first local region is an extreme point when an absolute value of a density difference between the density levels of the center picture element within the matrix and each of the surrounding picture elements is greater than or equal to a predetermined threshold value.

5. The dot region discriminating method as claimed in claim 4 wherein the surrounding picture elements within the matrix are respectively located in a specific direction from the center picture element within the matrix.

6. The dot region discriminating method as claimed in claim 5 wherein the specific direction is selected from directions which are right, left, up, down or 45° angle to the center picture element within the matrix.

7. The dot region discriminating method as claimed in any of claim 2 wherein said dot region detecting step detects the dot region by moving each block one picture element at a time.

8. The dot region discriminating method as claimed in claim 7 wherein said dot region detecting step detects that the center picture element of an object block is a dot region when a number of blocks in which the number of extreme points is greater than or equal to a predetermined threshold value is greater than or equal to a predetermined threshold value.

9. The dot region discriminating method as claimed in claim 7 wherein said dot region detecting step detects that the center picture element of an object block is a dot region when a sum total of absolute values of differences between the number of extreme points in an object block and the surrounding blocks is less than or equal to a predetermined threshold value.

10. The dot region discriminating method as claimed in claim 1 wherein said dot region detecting step detects the dot region by moving each block one block at a time.

11. The dot region discriminating method as claimed in claim 10 wherein said dot region detecting step detects that all picture elements within an object block are dot regions when the number of blocks in which the number of extreme points is greater than or equal to the predetermined threshold value is greater than or equal to the predetermined threshold value.

12. The dot region discriminating method as claimed in claim 10 wherein said dot region detecting step detects that all picture elements within an object block are dot regions when a sum total of absolute values of differences between the number of extreme points in the object block and the surrounding blocks is less than or equal to a predetermined threshold value.

13. The dot region discriminating method as claimed in claim 1 wherein said extreme point detecting step uses a rectangular region of the image as said first local region.

14. The dot region discriminating method as claimed in claim 1 which further comprises a smoothing step for smoothing the digital multilevel input image signal prior to said extreme point detecting step, said extreme point detecting step detects the one or a plurality of extreme points from said first local region within the image and a smoothened image which is described by a smoothened digital multilevel input image signal, and said dot region detecting step detects the dot region based on a synthesized image which is a logical sum of the image and the smoothened image.

15. The dot region discriminating method as claimed in claim 1/wherein said extreme point detecting step independently detects one or a plurality of extreme points from said first local region within the image based on first and second extreme point detection conditions which are mutually different, and said dot region detecting step detects the dot region based on a logical sum of results of the extreme point detection made with said first and second extreme point detection conditions.

16. The dot region discriminating method as claimed in claim 15 wherein said first extreme point detection condition determines a center picture element within said first local region as an extreme point when a density level of the center picture element within said first local region is a predetermined threshold value greater than or a predetermined threshold value smaller than the density levels of surrounding picture elements within said first local region.

17. The dot region discriminating method as claimed in claim 16 wherein said second extreme point detection condition determines the center picture element within said first local region as an extreme point when the density level of the center picture element within said first local region is greater than or equal to the density levels of all other picture elements which are within a region of L×L picture elements including the center picture element within said first local region and the density level of the center picture element within said first local region is a predetermined threshold value greater than or equal to the density levels of the other picture elements which are outside the region comprising L×L picture elements and inside a region comprising M×M picture elements, where L<M.

18. The dot region discriminating method as claimed in claim 16 wherein said second extreme point detection condition determines the center picture element within said first local region as an extreme point when the density level of the center picture element within said first local region is less than or equal to the density levels of all other picture elements indicated which are within a region of L×L picture elements including the center picture element within said first local region and the density level of the center picture element within said first local region is a predetermined threshold value less than or equal to the density levels of the other picture elements which are outside the region comprising L×L picture elements and inside a region comprising M×M picture elements, where L<M.

19. The dot region discriminating method as claimed in claim 15 which further comprises a smoothing step for smoothing the digital multilevel input image signal prior to said extreme point detecting step, said extreme point detecting step detects the one or a plurality of extreme points from said first local region within the image and a smoothened image which is described by a smoothened digital multilevel input image signal, and said dot region detecting step detects the dot region based on a synthesized image which is a logical sum of the image and the smoothened image.

20. The dot region discriminating method as claimed in claim 1 wherein said extreme point detecting step detects that a center picture element within said first local region is an extreme point when a density level of the center picture element within said first local region is greater than or less than density levels of surrounding picture elements within said first local region.

21. The dot region discriminating method as claimed in claim 20 wherein said extreme point detecting step detects that the center picture element within said first local region is an extreme point when an absolute value of a density difference between the density level of the center picture element within said first local region and an average value of the density levels of two picture elements which are located at symmetrical positions about the center picture element within said first local region is greater than or equal to a predetermined threshold value.

22. The dot region discriminating method as claimed in claim 1 wherein said dot region detecting step includes substeps of subdividing each block into a plurality of small regions and determining the number of extreme points within each block depending on a distribution of the extreme points detected within the small regions of the block.

23. The dot region discriminating method as claimed in claim 22 wherein said substep of determining the number of extreme points determines that the number extreme points is zero when a number of extreme points is obtained for each of the small regions within the block which comprises N×N picture elements with respect to both the peak and valley if a number of small regions in which the number of extreme points is zero is greater than or equal to a predetermined value.

24. The dot region discriminating method as claimed in claim 23 wherein said substep of determining the number of extreme points obtains a sum of the numbers of extreme points of the small regions for the peaks and for the valleys if the number of small regions in which the number of extreme points is zero is less than the predetermined value and determines that the larger sum is the number of extreme points of the block.

25. The dot region discriminating method as claimed in claim 14 wherein said extreme point detecting step uses a rectangular region of the image as said first local region.

26. The dot region discriminating method as claimed in claim 1 wherein said dot region detecting step detects that the center picture element of an object block or the object block itself is a dot region when a number of picture elements which are adjacent to the center picture element and correspond to extreme points is greater than a predetermined threshold value.

27. The dot region discriminating method as claimed in claim 2 wherein said extreme point detecting step detects that a center picture element within the matrix which corresponds to said first local region is an extreme point when a density level of the center picture element within the matrix is a maximum or a minimum compared to density levels of picture elements surrounding the center picture element within the matrix.

28. The dot region discriminating method as claimed in claim 2 wherein said dot region detecting step detects the dot region by moving each block one picture element at a time.

29. The dot region discriminating method as claimed in claim 3 wherein said dot region detecting step detects the dot region by moving each block one picture element at a time.

30. The dot region discriminating method as claimed in claim 4 wherein said dot region detecting step detects the dot region by moving each block one picture element at a time.

31. The dot region discriminating method as claimed in claim 5 wherein said dot region detecting step detects the dot region by moving each block one picture element at a time.

32. The dot region discriminating method as claimed in claim 6 wherein said dot region detecting step detects the dot region by moving each block one picture element at a time.

33. The dot region discriminating method as claimed in claim 2 wherein said dot region detecting step detects the dot region by moving each block one block at a time.

34. The dot region discriminating method as claimed in claim 3 wherein said dot region detecting step detects the dot region by moving each block one block at a time.

35. The dot region discriminating method as claimed in claim 4 wherein said dot region detecting step detects the dot region by moving each block one block at a time.

36. The dot region discriminating method as claimed in claim 5 wherein said dot region detecting step detects the dot region by moving each block one block at a time.

37. The dot region discriminating method as claimed in claim 6 wherein said dot region detecting step detects the dot region by moving each block one block at a time.

38. The dot region discriminating method as claimed in claim 2 wherein said extreme point detecting step uses a rectangular region of the image as said first local region.

39. The dot region discriminating method as claimed in claim 3 wherein said extreme point detecting step uses a rectangular region of the image as said first local region.

40. The dot region discriminating method as claimed in claim 4 wherein said extreme point detecting step uses a rectangular region of the image as said first local region.

41. The dot region discriminating method as claimed in claim 5 wherein said extreme point detecting step uses a rectangular region of the image as said first local region.

42. The dot region discriminating method as claimed in claim 6 wherein said extreme point detecting step uses a rectangular region of the image as said first local region.

43. The dot region discriminating method as claimed in claim 7 wherein said extreme point detecting step uses a rectangular region of the image as said first local region.

44. The dot region discriminating method as claimed in claim 8 wherein said extreme point detecting step uses a rectangular region of the image as said first local region.

45. The dot region discriminating method as claimed in claim 9 wherein said extreme point detecting step uses a rectangular region of the image as said first local region.

46. The dot region discriminating method as claimed in claim 10 wherein said extreme point detecting step uses a rectangular region of the image as said first local region.

47. The dot region discriminating method as claimed in claim 11 wherein said extreme point detecting step uses a rectangular region of the image as said first local region.

48. The dot region discriminating method as claimed in claim 12 wherein said extreme point detecting step uses a rectangular region of the image as said first local region.

49. The dot region discriminating method as claimed in claim 2 which further comprises a smoothing step for smoothing the digital multilevel input signal prior to said extreme point detecting step, said extreme point detecting step detects the one or a plurality of extreme points from said first local region within the image and a smoothened image which is described by a smoothened digital multilevel input image signal, and said dot region detecting step detects the dot region based on a synthesized image which is a logical sum of the image and the smoothened image.

50. The dot region discriminating method as claimed in claim 3 which further comprises a smoothing step for smoothing the digital multilevel input signal prior to said extreme point detecting step, said extreme point detecting step detects the one or a plurality of extreme points from said first local region within the image and a smoothened image which is described by a smoothened digital multilevel input image signal, and said dot region detecting step detects the dot region based on a synthesized image which is a logical sum of the image and the smoothened image.

51. The dot region discriminating method as claimed in claim 4 which further comprises a smoothing step for smoothing the digital multilevel input signal prior to said extreme point detecting step, said extreme point detecting step detects the one or a plurality of extreme points from said first local region within the image and a smoothened image which is described by a smoothened digital multilevel input image signal, and said dot region detecting step detects the dot region based on a synthesized image which is a logical sum of the image and the smoothened image.

52. The dot region discriminating method as claimed in claim 5 which further comprises a smoothing step for smoothing the digital multilevel input signal prior to said extreme point detecting step, said extreme point detecting step detects the one or a plurality of extreme points from said first local region within the image and a smoothened image which is described by a smoothened digital multilevel input image signal, and said dot region detecting step detects the dot region based on a synthesized image which is a logical sum of the image and the smoothened image.

53. The dot region discriminating method as claimed in claim 6 which further comprises a smoothing step for smoothing the digital multilevel input signal prior to said extreme point detecting step, said extreme point detecting step detects the one or a plurality of extreme points from said first local region within the image and a smoothened image which is described by a smoothened digital multilevel input image signal, and said dot region detecting step detects the dot region based on a synthesized image which is a logical sum of the image and the smoothened image.

54. The dot region discriminating method as claimed in claim 7 which further comprises a smoothing step for smoothing the digital multilevel input signal prior to said extreme point detecting steps, said extreme point detecting step detects the one or a plurality of extreme points from said first local region within the image and a smoothened image which is described by a smoothened digital multilevel input image signal, and said dot region detecting step detects the dot region based on a synthesized image which is a logical sum of the image and the smoothened image.

55. The dot region discriminating method as claimed in claim 8 which further comprises a smoothing step for smoothing the digital multilevel input signal prior to said extreme point detecting step, said extreme point detecting step detects the one or a plurality of extreme points from said first local region within the image and a smoothened image which is described by a smoothened digital multilevel input image signal, and said dot region detecting step detects the dot region based on a synthesized image which is a logical sum of the image and the smoothened image.

56. The dot region discriminating method as claimed in claim 9 which further comprises a smoothing step for smoothing the digital multilevel input signal prior to said extreme point detecting step, said extreme point detecting step detects the one or a plurality of extreme points from said first local region within the image and a smoothened image which is described by a smoothened digital multilevel input image signal, and said dot region detecting step detects the dot region based on a synthesized image which is a logical sum of the image and the smoothened image.

57. The dot region discriminating method as claimed in claim 10 which further comprises a smoothing step for smoothing the digital multilevel input signal prior to said extreme point detecting step, said extreme point detecting step detects the one or a plurality of extreme points from said first local region within the image and a smoothened image which is described by a smoothened digital multilevel input image signal, and said dot region detecting step detects the dot region based on a synthesized image which is a logical sum of the image and the smoothened image.

58. The dot region discriminating method as claimed in claim 11 which further comprises a smoothing step for smoothing the digital multilevel input signal prior to said extreme point detecting step, said extreme point detecting step detects the one or a plurality of extreme points from said first local region within the image and a smoothened image which is described by a smoothened digital multilevel input image signal, and said dot region detecting step detects the dot region based on a synthesized image which is a logical sum of the image and the smoothened image.

59. The dot region discriminating method as claimed in claim 12 which further comprises a smoothing step for smoothing the digital multilevel input signal prior to said extreme point detecting step, said extreme point detecting step detects the one or a plurality of extreme points from said first local region within the image and a smoothened image which is described by a smoothened digital multilevel input image signal, and said dot region detecting step detects the dot region based on a synthesized image which is a logical sum of the image and the smoothened image.

60. The dot region discriminating method as claimed in claim 13 which further comprises a smoothing step for smoothing the digital multilevel input signal prior to said extreme point detecting step, said extreme point detecting step detects the one or a plurality of extreme points from said first local region within the image and a smoothened image which is described by a smoothened digital multilevel input image signal, and said dot region detecting step detects the dot region based on a synthesized image which is a logical sum of the image and the smoothened image.

61. The dot region discriminating method as claimed in claim 15 wherein said extreme point detecting step uses a rectangular region of the image as said first local region.

62. The dot region discriminating method as claimed in claim 16 wherein said extreme point detecting step uses a rectangular region of the image as said first local region.

63. The dot region discriminating method as claimed in claim 17 wherein said extreme point detecting step uses a rectangular region of the image as said first local region.

64. The dot region discriminating method as claimed in claim 18 wherein said extreme detecting step uses a rectangular region of the image as said first local region.

65. The dot region discriminating method as claimed in claim 19 wherein said extreme point detecting step uses a rectangular region of the image as said first local region.

66. The dot region discriminating method as claimed in claim 20 wherein said extreme point detecting step uses a rectangular region of the image as said first local region.

67. The dot region discriminating method as claimed in claim 21 wherein said extreme point detecting step uses a rectangular region of the image as said first local region.

68. The dot region discriminating method as claimed in claim 22 wherein said extreme point detecting step uses a rectangular region of the image as said first local region.

69. The dot region discriminating method as claimed in claim 23 wherein said extreme point detecting step uses a rectangular region of the image as said first local region.

70. The dot region discriminating method as claimed in claim 24 wherein said extreme point detecting step uses a rectangular region of the image as said first local region.

* * * * *